(12) United States Patent
Kasami et al.

(10) Patent No.: US 7,570,578 B2
(45) Date of Patent: Aug. 4, 2009

(54) ORTHOGONAL FREQUENCY DIVISION DEMODULATOR, METHOD AND COMPUTER PROGRAM PRODUCT

(75) Inventors: Hideo Kasami, Kanagawa-ken (JP);
Hidehiro Matsuoka, Kanagawa-ken (JP); Makoto Tsuruta, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 639 days.

(21) Appl. No.: 11/268,657

(22) Filed: Nov. 8, 2005

(65) Prior Publication Data

US 2006/0114814 A1    Jun. 1, 2006

(30) Foreign Application Priority Data

Nov. 30, 2004    (JP) ............................. 2004-347777

(51) Int. Cl.
*H04J 11/00* (2006.01)
(52) U.S. Cl. ...................... 370/206; 370/208; 375/262; 375/341
(58) Field of Classification Search ......... 370/203–211, 370/510, 515, 512, 513, 503, 509; 375/362, 375/371, 139, 143–153, 260–262, 316, 340–343, 375/346–351
See application file for complete search history.

(56) References Cited

U.S. PATENT DOCUMENTS

| 6,115,354 | A  | * | 9/2000  | Weck ......................... 370/203 |
| 7,177,376 | B2 | * | 2/2007  | Atungsiri et al. ............ 375/343 |
| 7,400,573 | B2 | * | 7/2008  | Sundstrom et al. .......... 370/208 |
| 2003/0117943 | A1 | * | 6/2003 | Sakata et al. ................ 370/210 |
| 2004/0218522 | A1 | * | 11/2004 | Sundstrom et al. .......... 370/208 |

(Continued)

FOREIGN PATENT DOCUMENTS

JP    2001-223663    8/2001

(Continued)

OTHER PUBLICATIONS

N. Suzuki, et al., "A New OFDM Demodulation Method With Variable-Length Effective Symbol and ICI Canceller", Fundementals, IEICE Trans., vol. E85-A, No. 12, Dec. 2002, pp. 2859-2867.

(Continued)

*Primary Examiner*—Aung S Moe
*Assistant Examiner*—Habte Mered
(74) *Attorney, Agent, or Firm*—Oblon, Spivak, McClelland, Maier & Neustadt, P.C.

(57) ABSTRACT

An OFDM demodulator that demodulates an OFDM signal includes an antenna that receives a signal including delayed signals, an estimation circuit that estimates the channel response of the received signal, and a control circuit that controls a length of a retention time interval based on the estimated channel response. The retention time interval includes a time period from the head of a delayed signal having a maximum delay time in the delayed signals to the tail of a preceding signal in the delayed signals based on the estimated channel response. The OFDM demodulator also includes a retention memory that retains a portion of the received signal corresponding to the retention time period, and a selection circuit that selects an OFDM symbol based on a calculation of a maximum likelihood that the retained received signal is equivalent to a signal replica based on the channel response.

17 Claims, 32 Drawing Sheets

U.S. PATENT DOCUMENTS

| | | | |
|---|---|---|---|
| 2005/0163265 A1* | 7/2005 | Gupta | 375/343 |
| 2006/0114814 A1* | 6/2006 | Kasami et al. | 370/208 |
| 2007/0053280 A1* | 3/2007 | Uesugi | 370/208 |
| 2007/0110174 A1* | 5/2007 | Glazko et al. | 375/260 |
| 2008/0043857 A1* | 2/2008 | Ribeiro Dias et al. | 375/260 |

FOREIGN PATENT DOCUMENTS

| | | |
|---|---|---|
| JP | 2002-033715 | 1/2002 |
| JP | 2002-094479 | 3/2002 |
| JP | 2004-165990 | 6/2004 |
| JP | 2004-208254 | 7/2004 |
| JP | 2004-221702 | 8/2004 |
| JP | 2004-289475 | 10/2004 |
| JP | 2005-354678 | 12/2005 |

OTHER PUBLICATIONS

U.S. Appl. No. 11/619,385, filed Jan. 3, 2007, Kasami.
U.S. Appl. No. 11/268,657, filed Nov. 8, 2005, Kasami et al.
U.S. Appl. No. 11/387,966, filed Mar. 24, 2006, Kasami et al.

* cited by examiner

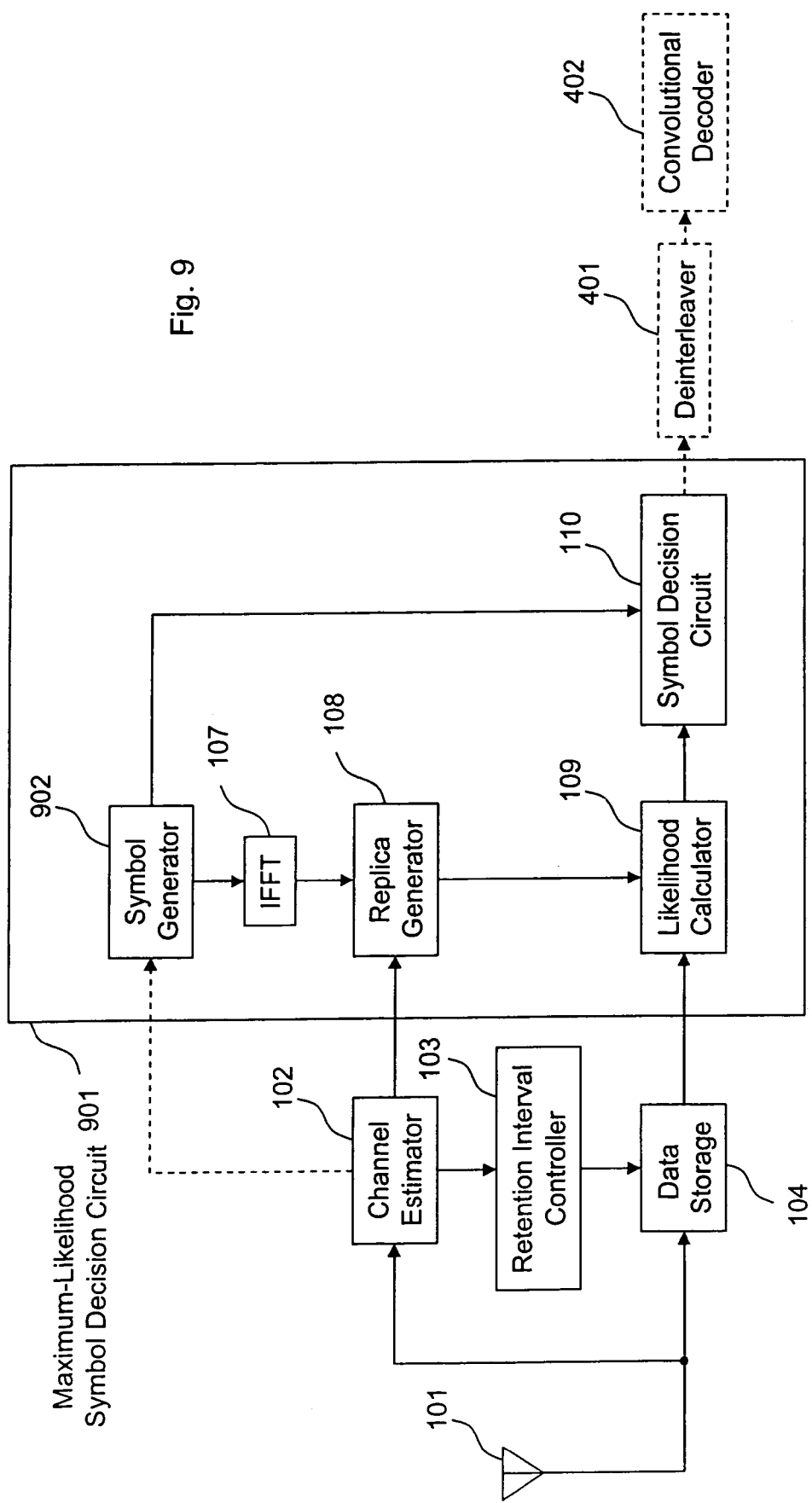

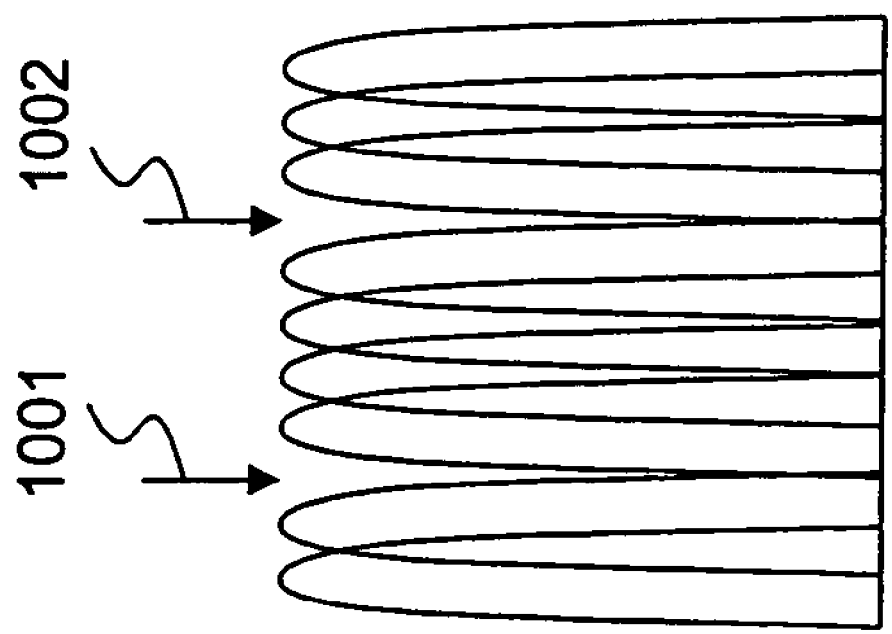

Second Stage

First Stage

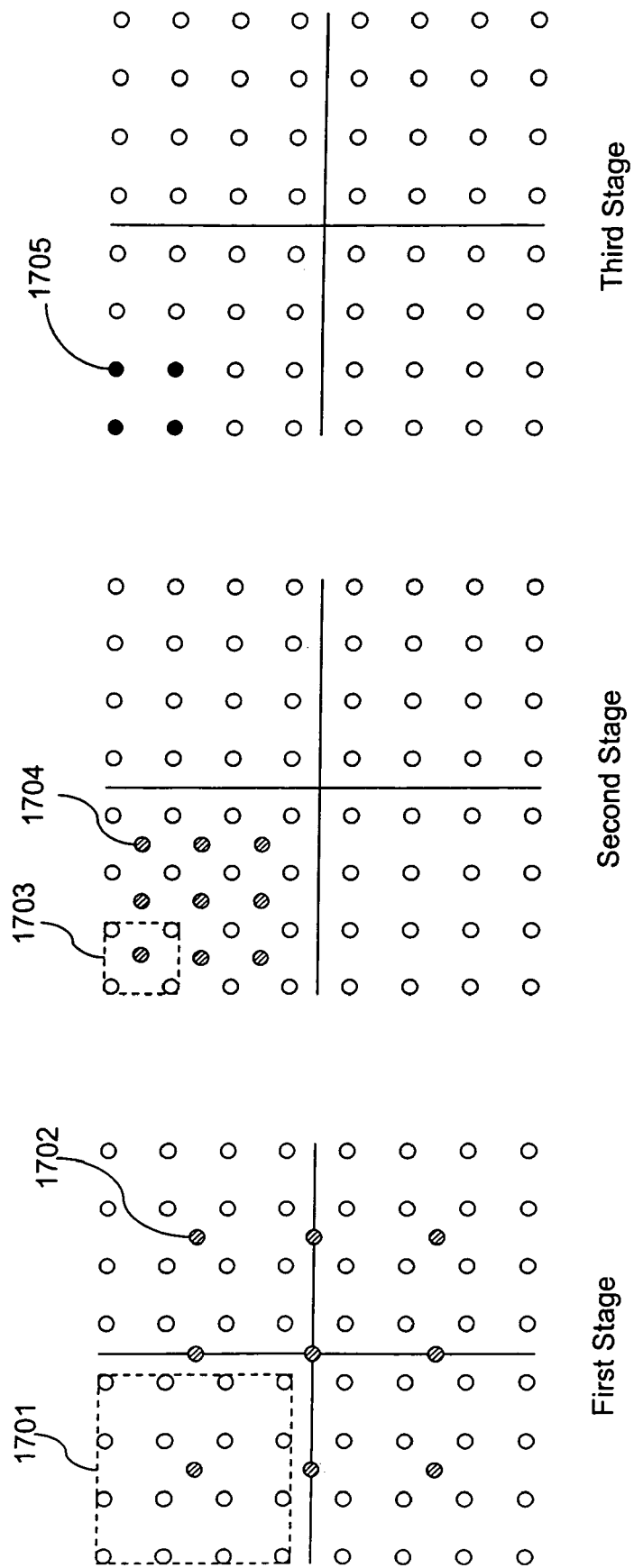
Fig. 17A First Stage
Fig. 17B Second Stage
Fig. 17C Third Stage

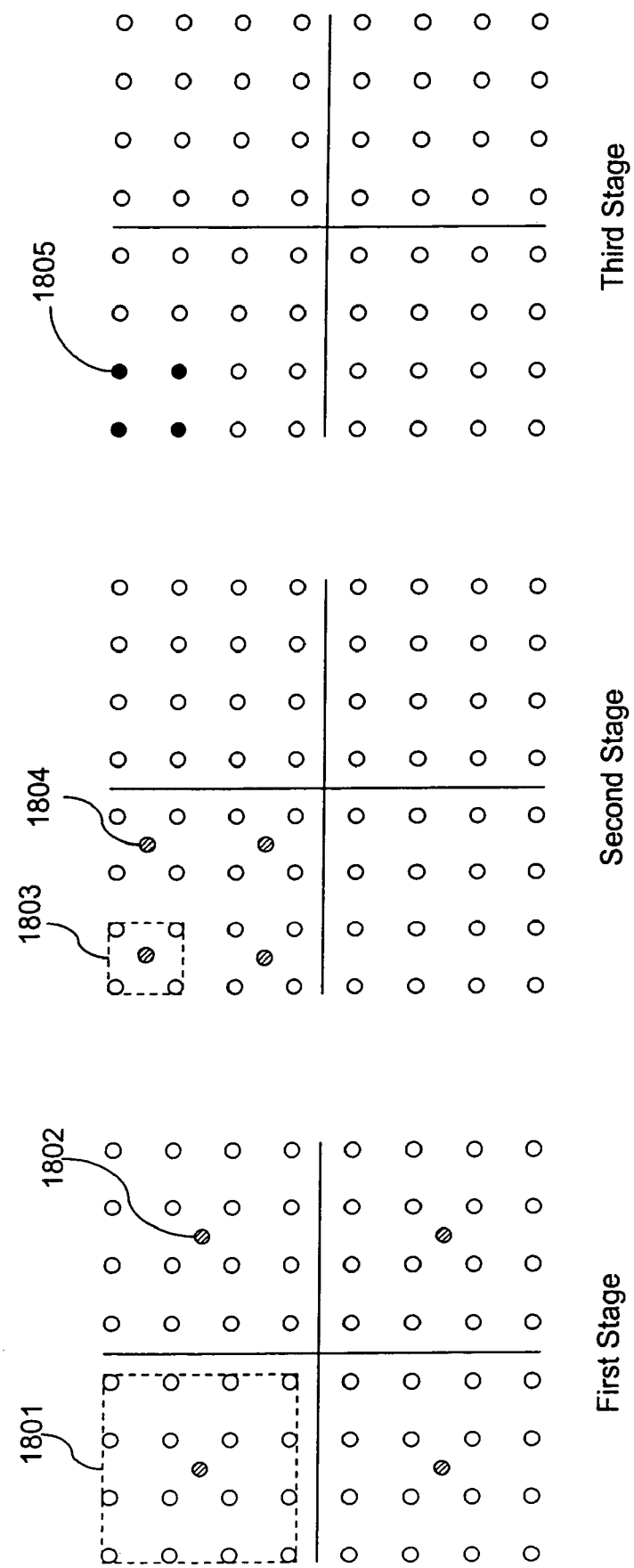
Fig. 18C  Third Stage
Fig. 18B  Second Stage
Fig. 18A  First Stage

2101

2102

2103

2104

2401

2402 Group 1

2403 Group 2

2404 Group 3

2401

2402 Group 1

2403 Group 2

2404 Group 3

2701 Group 1

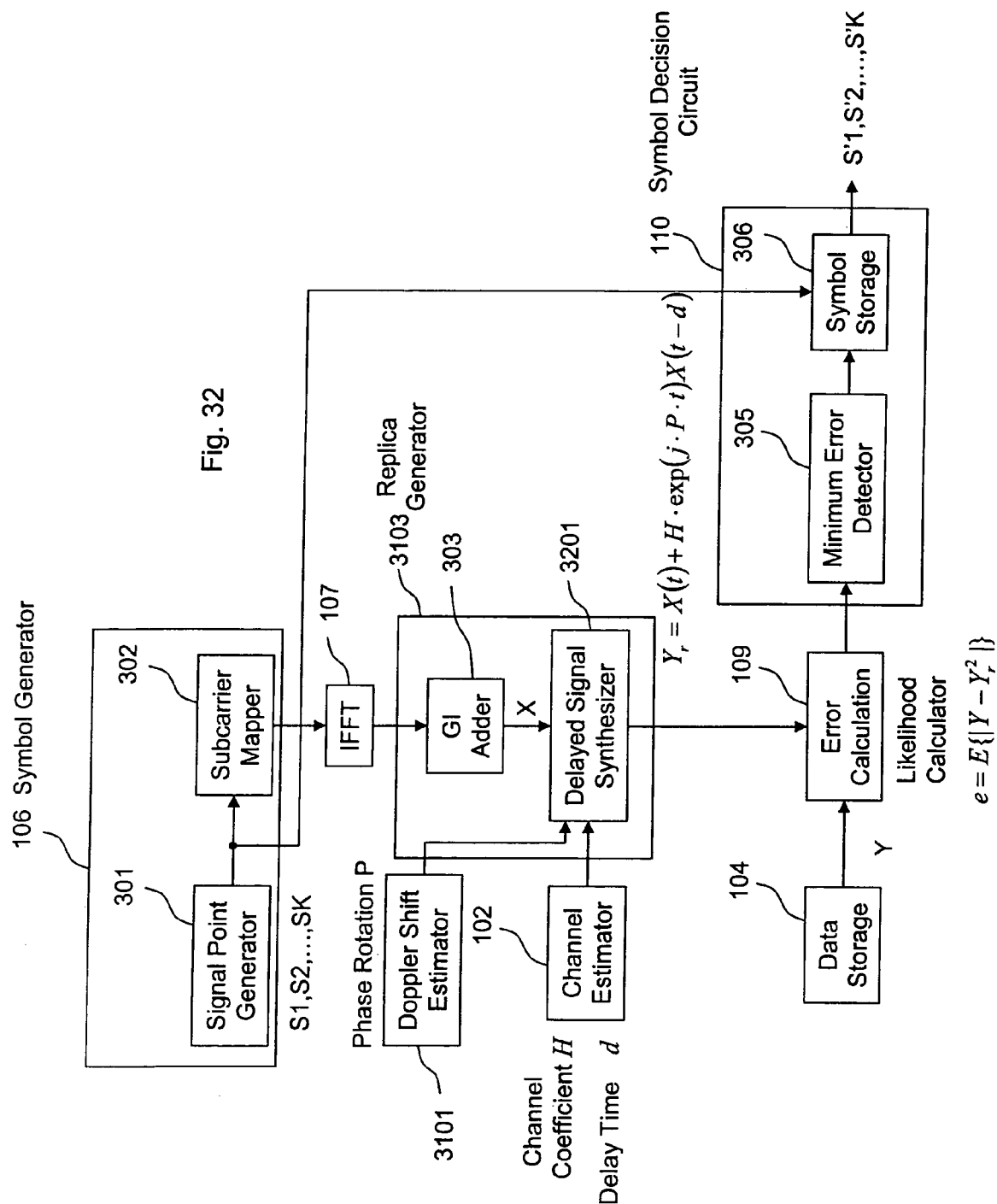

ORTHOGONAL FREQUENCY DIVISION DEMODULATOR, METHOD AND COMPUTER PROGRAM PRODUCT

CROSS-REFERENCE TO RELATED APPLICATION

This application is based upon and claims the benefit of priority from the prior Japanese Patent Application No. 2004-347777, filed Nov. 30, 2004, the entire contents of which are incorporated herein by reference.

BACKGROUND OF THE INVENTION

1. Field of the Invention

The present invention relates to an OFDM (Orthogonal Frequency Division Multiplexing) demodulator which demodulates an OFDM signal, and more particularly to an OFDM demodulator that reduces interference ascribable to a delay difference greater than the Guard Interval (GI).

2. Discussion of the Background

A conventional countermeasure against having a delay difference greater than the GI includes an equalization that removes a delay difference greater than the GI. For example, Japanese Patent Application No. 2002-329715 describes a feedback type equalizer. Such an equalizer, however, has a problem that reception characteristics deteriorate as the level of delay difference greater than the GI increases.

SUMMARY OF THE INVENTION

Accordingly, an advantage of an aspect of the present invention is to provide an OFDM demodulator providing improved reception characteristics in the case where the level of a delay difference greater than the GI is large.

According to one embodiment of the present invention there is provided a novel OFDM demodulator including an antenna configured to receive a signal including delayed signals, an estimation circuit configured to estimate a channel response based on the signal received by the antenna, and a control circuit configured to control a length of a retention time interval based on the channel response estimated by the estimation circuit. The retention time interval includes a time period between a first time when a head of a delayed signal having a maximum delay difference among the delayed signals is received and a second time when a tail of a preceding signal included in the signal received by the antenna is received. The OFDM demodulator also includes a retention memory configured to retain a portion of the signal received by the antenna corresponding to the retention interval, a symbol generation circuit configured to generate OFDM symbol candidates, a conversion circuit configured to convert the OFDM symbol candidates into time domain signals, a replica generation circuit configured to generate replica signals of the signal received by the antenna based on the time domain signals and the channel response estimated by the estimation circuit, a calculation circuit configured to calculate likelihoods that the replica signals are equivalent to the portion of the signal retained in the retention memory, and a selection circuit configured to select an OFDM symbol from the OFDM symbol candidates that corresponds to the replica signal having a maximum likelihood.

According to another embodiment of the present invention there is provided a novel method for demodulating an OFDM received signal including plural delayed signals received by an antenna. The method includes estimating a channel response based on the received signal, and controlling a length of a retention interval based on the estimated channel response. The retention interval includes a time period between a first time when a head of a delayed signal having a maximum delay difference among the delayed signals is received and a second time when a tail of a preceding signal included in the received signal is received. The method also includes retaining a portion of the received signal corresponding to the retention interval, generating OFDM symbol candidates, converting the OFDM symbol candidates into time domain signals, generating replica signals of the received signal based on the time domain signals and the estimated channel response, calculating likelihoods that the replica signals are equivalent to the portion of the received signal retained in the retention memory, and selecting an OFDM symbol from the OFDM symbol candidates that corresponds to the replica signal having a maximum likelihood.

According to another embodiment of the present invention there is provided a novel computer program product storing a program which, when executed by a processor in an apparatus configured to demodulate an OFDM received signal including plural delayed signals received by an antenna, causes the processor to perform steps including estimating a channel response based on the received signal, and controlling a length of a retention interval based on the estimated channel response. The retention interval includes a time period between a first time when a head of a delayed signal having a maximum delay difference among the delayed signals is received and a second time when a tail of a preceding signal included in the received signal is received. The method also includes retaining a portion of the received signal corresponding to the retention interval, generating OFDM symbol candidates, converting the OFDM symbol candidates into time domain signals, generating replica signals of the received signal based on the time domain signals and the estimated channel response, calculating likelihoods that the replica signals are equivalent to the portion of the received signal retained in the retention memory, and selecting an OFDM symbol from the OFDM symbol candidates that corresponds to the replica signal having a maximum likelihood.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a block diagram of an OFDM demodulator according to a fourth embodiment of the invention;

FIG. 10 is a diagram showing a situation where a symbol generator shown in FIG. 9 sets subcarriers at zero;

FIGS. 17A-17C are a diagrams showing an example in which the symbol generator shown in FIG. 15 decreases symbol candidates in three stages;

FIGS. 18A-18C are diagrams showing another example in which the symbol generator shown in FIG. 15 decreases symbol candidates in three stages;

FIG. 32 is a block diagram of a maximum-likelihood symbol decision circuit shown in FIG. 31.

DESCRIPTION OF THE PREFERRED EMBODIMENTS

Figure 1:
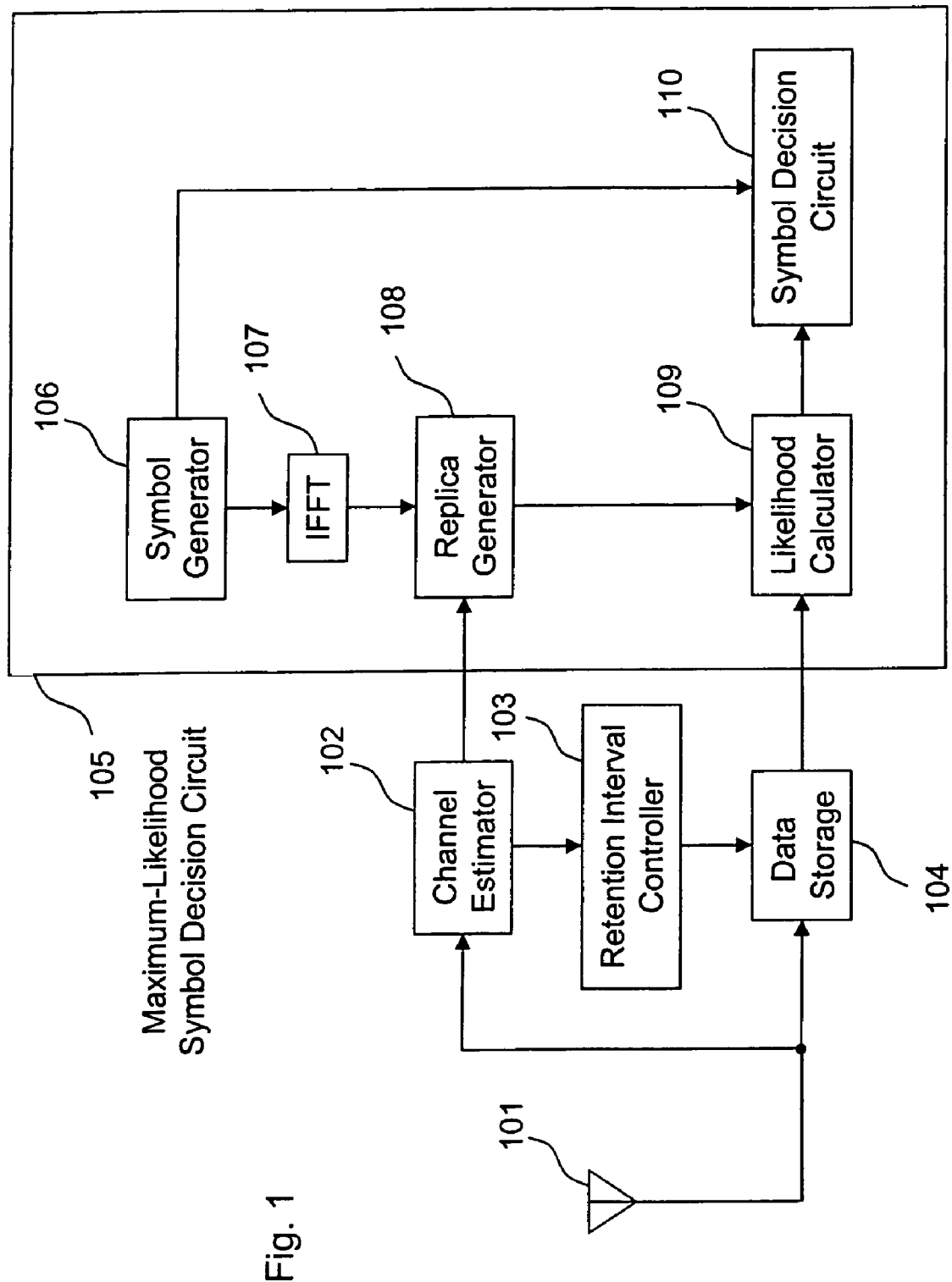
FIG. 1 is a block diagram of an OFDM demodulator according to a first embodiment of the present invention.

Embodiments of the invention will be explained with reference to the drawings, wherein like reference numerals designate identical or corresponding parts throughout the several views.

First Embodiment

FIG. 1 is a block diagram of an OFDM demodulator according to a first embodiment that includes an antenna 101, a channel estimator 102, a retention interval controller 103, a data storage 104 and a maximum-likelihood symbol decision circuit 105. The maximum-likelihood symbol decision circuit 105 includes a symbol generator 106, an IFFT (inverse fast Fourier transformer) 107, a replica generator 108, a likelihood calculator 109 and a symbol decision circuit 110.

The antenna 101 receives an OFDM signal and delivers the received signal to an LNA (low noise amplifier). The LNA amplifies the OFDM signal to a desired amplitude. A frequency converter converts the OFDM signal amplified by the LNA, into an IF (intermediate frequency) band. A variable-gain amplifier adjusts the frequency-converted OFDM signal to an appropriate signal level. An orthogonal demodulator subjects the level-adjusted OFDM signal to an orthogonal demodulation into a baseband signal. An A/D converter converts the baseband signal into a digital signal. Since the LNA, frequency converter, variable-gain amplifier, orthogonal demodulator and A/D converter are usually well-known devices, their description is confined to the brief description above and are not illustrated or discussed further.

The channel estimator 102 receives the digital signal so as to estimate a channel response. This channel estimator 102 estimates how a delayed signal delays from a first signal in the OFDM signal. Thus, the channel estimator 102 estimates a channel coefficient and a delay time.

The retention interval controller 103 sets a data retention interval being an interval for which the digital signal is stored based on the value of the channel response. This retention interval controller 103 sets as the data retention interval a time period between a first time when a head of a delayed signal is received having the maximum delay difference among delayed signals included in the received signal and a second time when a tail of a preceding signal is received. The data retention interval will be described later with reference to FIG. 2.

The data storage 104 stores the digital signal which exists during the data retention interval set by the controller 103.

The maximum-likelihood symbol decision circuit 105 generates a replica signal based on the channel response value from the channel estimator 102 and renders a decision so as to select a symbol which maximizes the likelihood that a replica signal is equivalent to the digital signal stored in the data storage 104.

The symbol generator 106 receives the information of a modulation scheme (for example, QPSK (quadrature phase-shift keying), 16 QAM (quadrature amplitude modulation) or 64 QAM) from an upper layer, the information of subcarrier number from a sequencer, and the counter value of a signal point from the sequencer, thereby to generate a symbol candidate. The IFFT 107 converts the generated symbol candidate into a time domain signal by an inverse Fourier transform.

The replica generator 108 generates the replicas of the received signal based on the channel response estimation value estimated by the channel estimator 102 and the converted time domain signal. Replica generator 108 generates plural replica signals that correspond to the delayed signals at detectable levels and delayed from the first signal in the received signal.

The likelihood calculator 109 calculates a likelihood that a replica signal is equivalent to the digital signal stored in the data storage 104. A replica signal having a minimum mean square error when compared to the stored digital signal is calculated as having a maximum likelihood. The symbol decision circuit 110 selects the symbol with a maximum likelihood calculated by the likelihood calculator 109.

Figure 2:
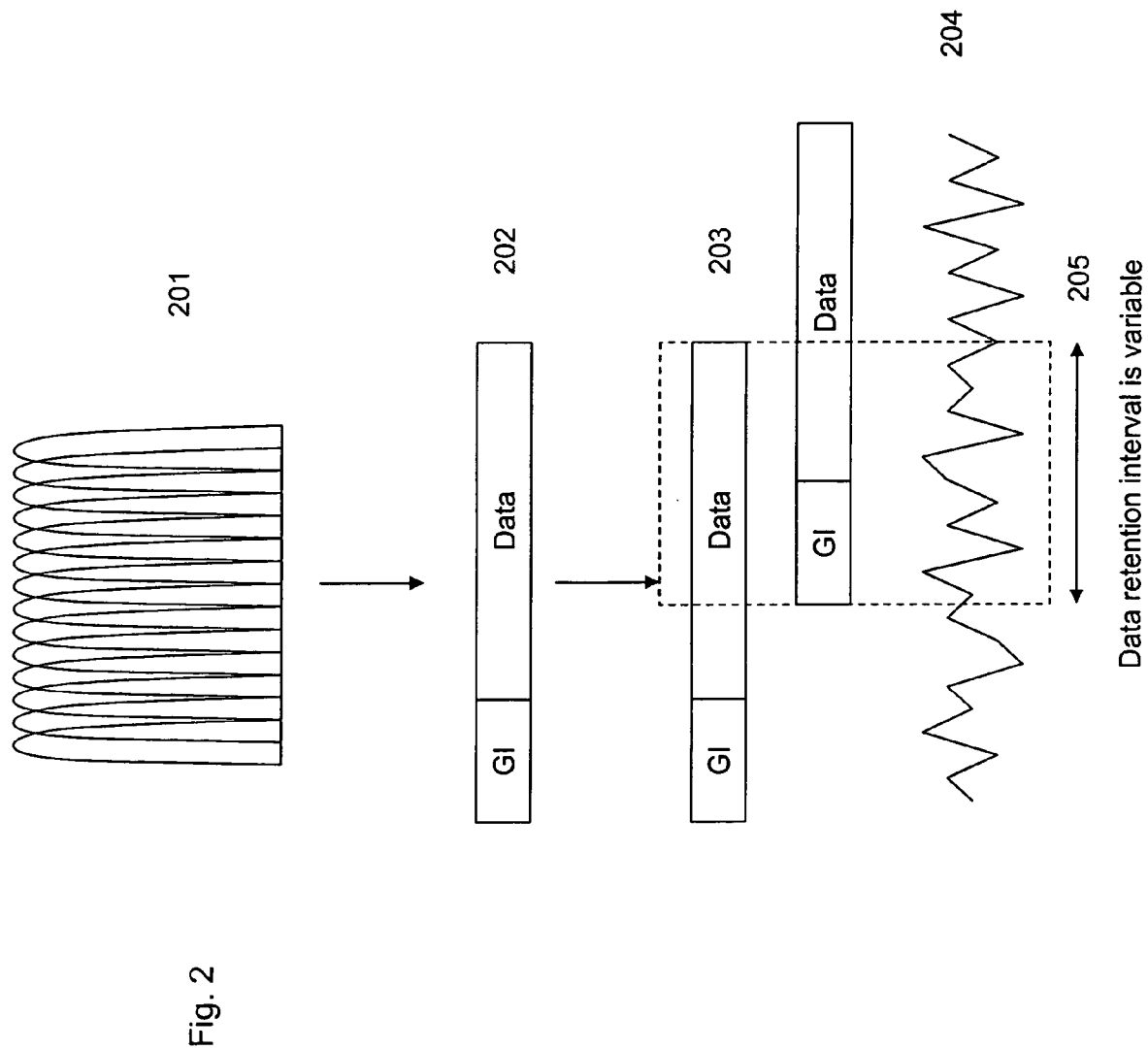
FIG. 2 is a diagram showing a situation where a digital signal changes in a maximum-likelihood symbol decision circuit shown in FIG. 1.

FIG. 2 shows an example of changes of the digital signal in the maximum-likelihood symbol decision circuit 105. The symbol generator 106 generates a symbol candidate 201. Thereafter, the IFFT 107 converts the symbol candidate 201 into a time signal 202 by an inverse Fourier transform. The replica generator 108 generates a plurality of replicas 203 which correspond to the delayed signals of levels detectable from the first signal. The likelihood calculator 109 calculates the likelihood between each of the replicas and the digital signal stored in the data storage 104.

In the example of FIG. 2, as shown at numeral 205, the retention interval controller 103 sets as a data retention interval, an interval which extends from the head of a delayed signal having the maximum delay time, to the tail of the first preceding signal.

Figure 3:
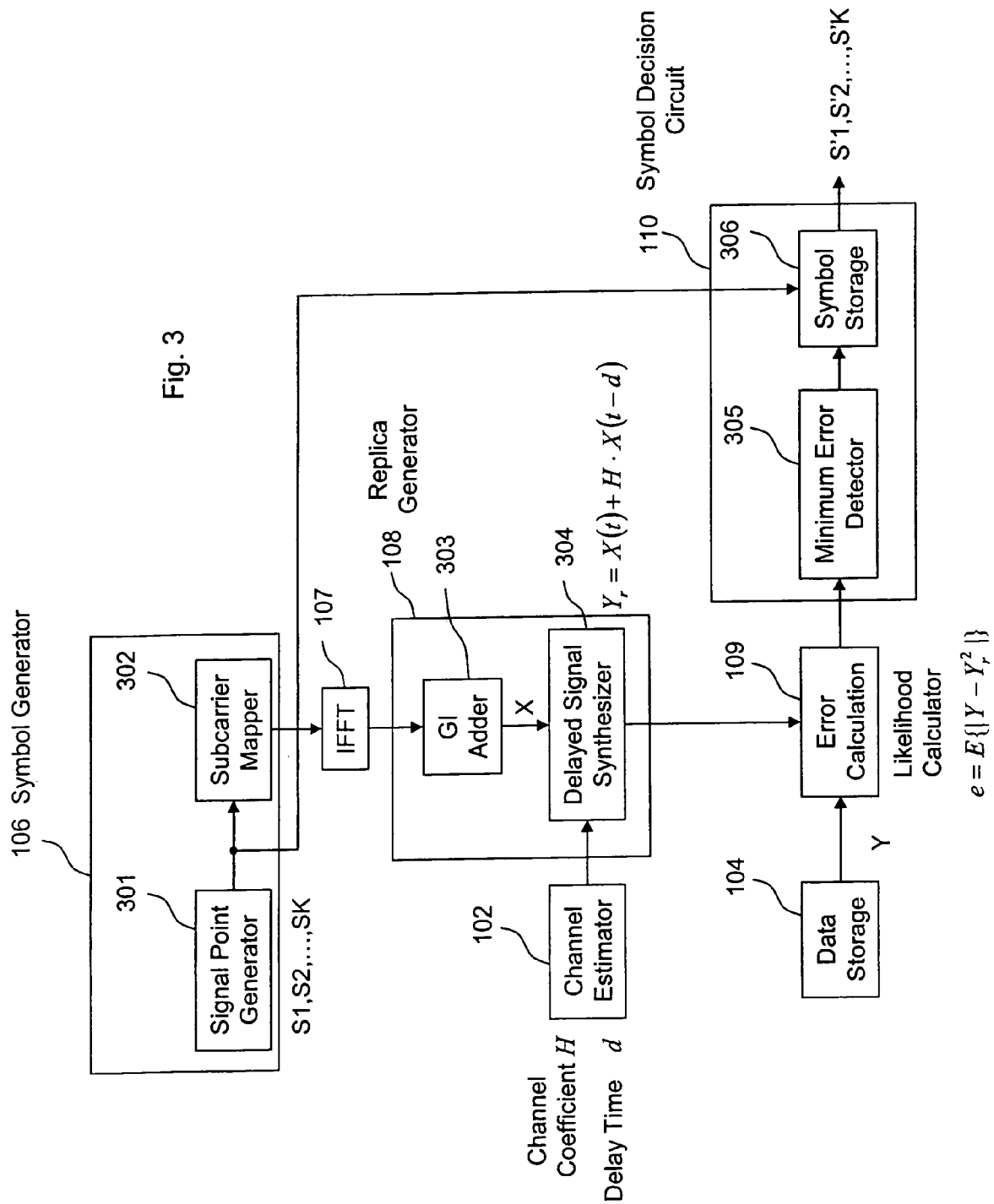
FIG. 3 is a block diagram of the maximum-likelihood symbol decision circuit shown in FIG. 1.

FIG. 3 is a detailed block diagram of the maximum-likelihood symbol decision circuit 105. In this example, the symbol generator 106 includes a signal point generator 301 and a subcarrier mapper 302, the replica generator 108 includes a GI (guard interval) adder 303 and a delayed signal synthesizer 304, and the symbol decision circuit 110 includes a minimum error detector 305 and a symbol storage 306.

The signal point generator 301 generates the signal points (S1, S2, . . . , SK) of individual subcarriers. In this embodiment, the number of the subcarriers is assumed to be K. This signal point generator 301 receives the information of the modulation scheme (such as QPSK, 16 QAM or 64 QAM) from the upper layer, the information of the subcarriers from the sequencer, and the counter values of the signal points from the sequencer, thereby to generate signal points. In a case, for example, where the signal point generator 301 has received the 64 QAM as the information of the modulation scheme from the upper layer, "5" as the information of the subcarrier number from the sequencer, and "3" as the counter value of the signal point from the sequencer, it generates the third signal point among the 64 signal points of the 64 QAM, in the fifth subcarrier.

The subcarrier mapper 302 maps the signal point generated by the signal point generator 301, in the pertinent subcarrier.

The GI adder 303 adds a GI to the time signal converted by and delivered from the IFFT 107. The delayed signal synthesizer 304 generates and synthesizes delayed signal components based on the signal X(t) with the GI added thereto, the channel coefficient H, and the delay time d. Concretely, the delayed signal synthesizer 304 computes Yr=X(t)+H×X(t−d). Although a single delayed signal case is described here, the embodiment is also applicable to a case of two or more delayed signals.

The likelihood calculator 109 calculates the mean squared error $e=E\{|Y-Yr|^2\}$ between the output signal Yr of the replica generator 108 and the digital signal Y stored in the data storage 104. A symbol which minimizes the error e becomes the symbol having the maximum likelihood.

The minimum error detector 305 detects the minimum error by generating a trigger signal when the error e has become the minimum. The symbol storage 306 stores therein signal points (S'1, S'2, . . . , S'K) at the time when the minimum error detector 305 has generated the trigger signal.

According to the first embodiment described above, the delay differences greater than the GI are synthesized, and hence, the first embodiment provides better reception performance than a conventional interference canceller. Moreover, in the present embodiment, the interval for which the received signal is retained is changed in accordance with the channel response estimation value, whereby the influence of preceding symbol interference is eliminated. Further, a conventional approach cannot normally decide a symbol because interference between subcarriers occurs when a symbol is decided by performing the FFT (fast Fourier transform) of a received signal for an interval shorter than an effective symbol length. In contrast, in the first embodiment, the received signal is not subjected to the FFT, so the symbol can normally be decided without the occurrence of the interference between the subcarriers.

Second Embodiment

Figure 4:
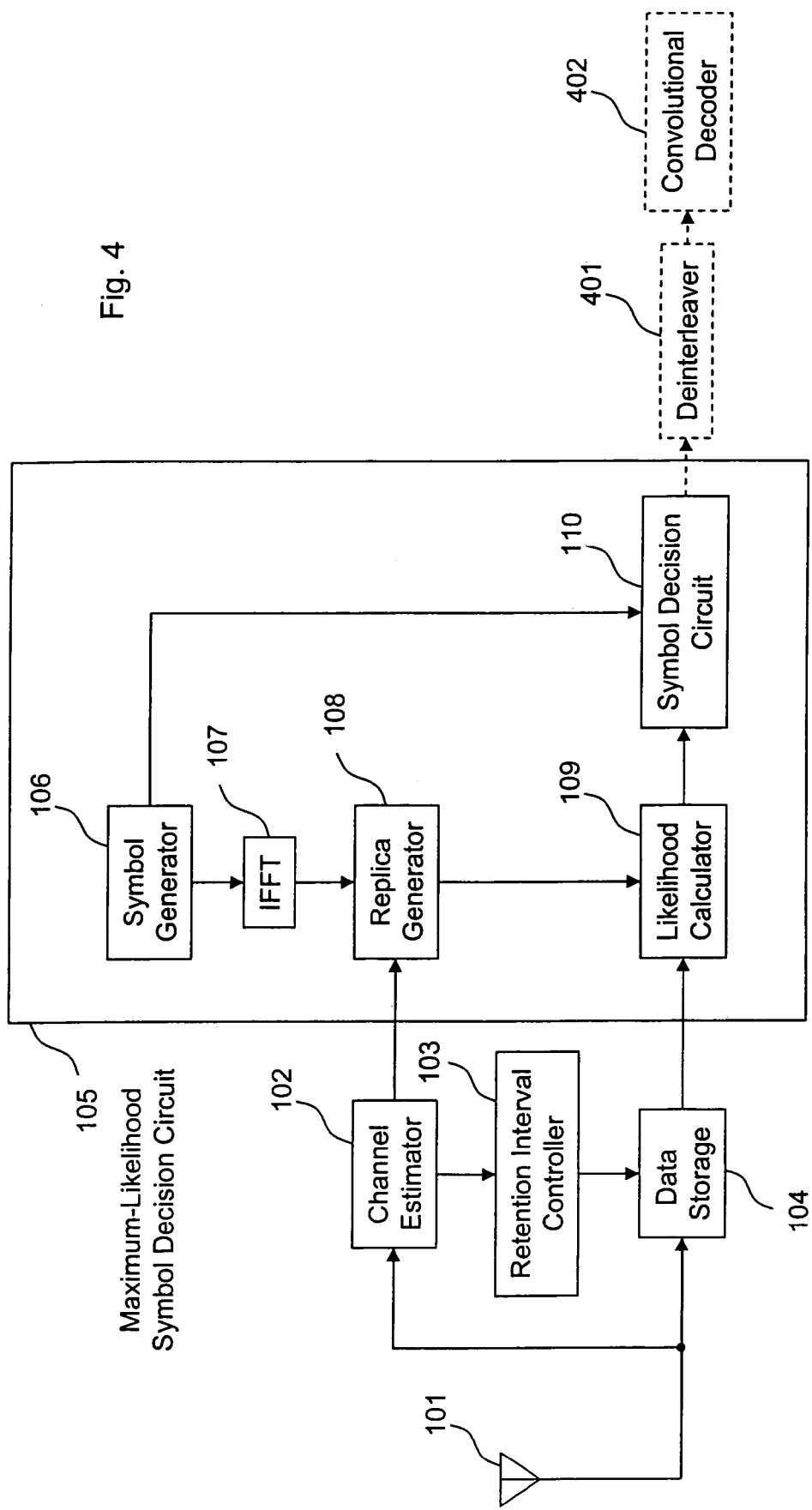
FIG. 4 is a block diagram of an OFDM demodulator according to a second embodiment of the invention.

FIG. 4 is a block diagram of a second embodiment that corresponds to a case of performing error correction decoding. An OFDM demodulator according to the second embodiment extinguishes the data of subcarriers in accordance with the correctability of the error correction decoding to decrease the number of symbol candidates. Identical reference numerals are assigned to the same apparatus parts as in the OFDM demodulator of the first embodiment and these parts are omitted from following description.

As shown in FIG. 4, the OFDM demodulator of the second embodiment includes a deinterleaver 401 and a convolutional decoder 402 in addition to the parts of the OFDM demodulator of the first embodiment.

The deinterleaver 401 deinterleaves a symbol selected by a maximum-likelihood symbol decision circuit 105. The convolutional decoder 402 subjects the deinterleaved signal to convolutional decoding. The convolutional decoding is one of the error correction decoding techniques.

Figure 5:
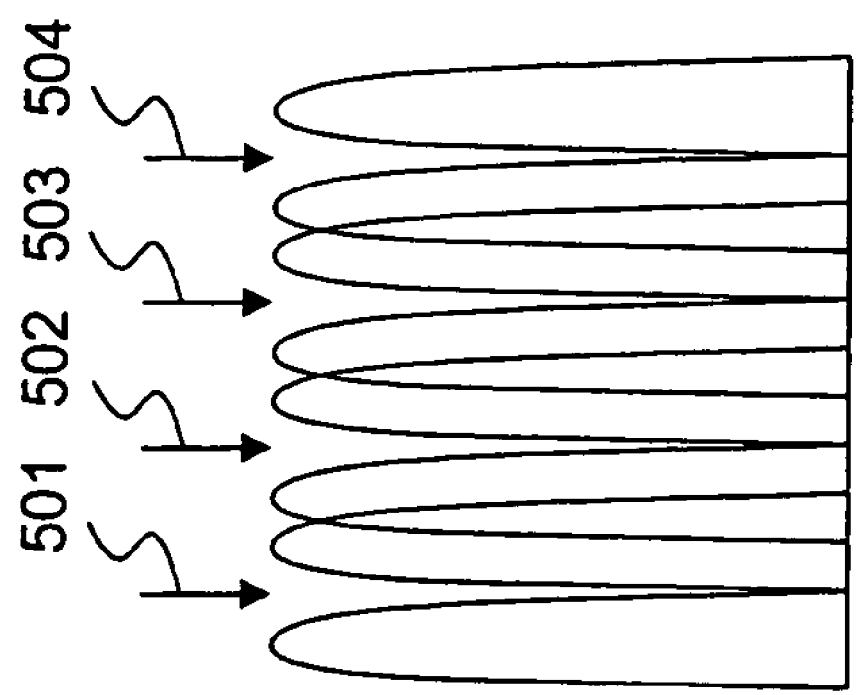
FIG. 5 is a diagram showing a situation where a symbol generator shown in FIG. 4 sets subcarriers at zero.

A symbol generator 106 sets to zero the values of a predetermined number of subcarriers among a plurality of subcarriers included in the OFDM symbol based on information inputted from an upper layer in accordance with a correctability of the convolutional decoder 402. By way of example, the symbol generator 106 sets every third subcarrier to zero as shown in FIG. 5 (subcarriers 501 through 504).

According to the second embodiment described above, the number of the subcarriers to be set to zero is adjusted in accordance with the capability of the error correction decoding, whereby the number of the symbol candidates can be lessened to realize the reduction of a processing quantity.

Third Embodiment

Figure 6:
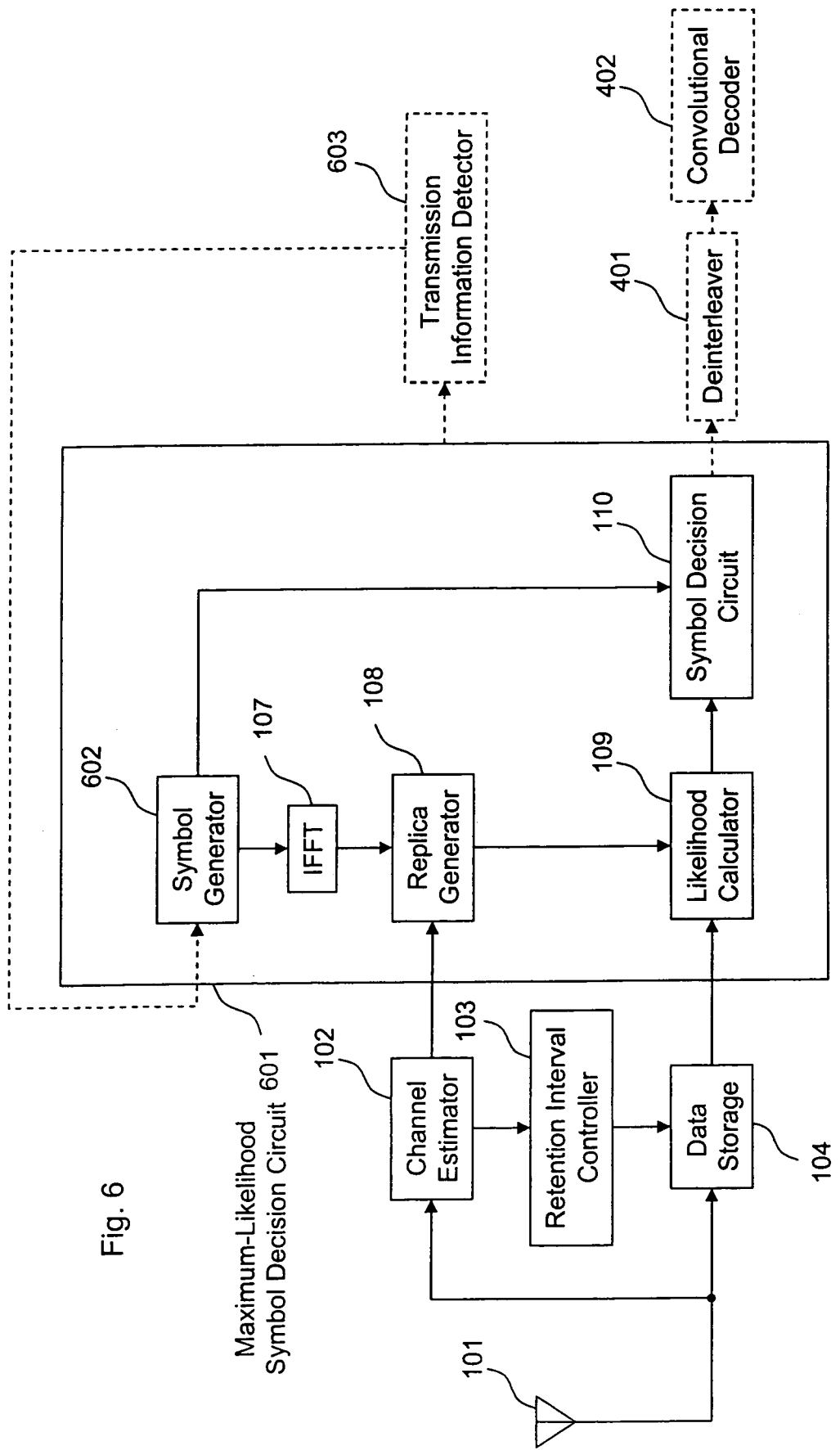
FIG. 6 is a block diagram of an OFDM demodulator according to a third embodiment of the invention.

FIG. 6 is a block diagram of a third embodiment that extinguishes data of subcarriers in accordance with a modulation scheme and error correction coding rate of a carrier to decrease a number of symbol candidates. Identical reference numerals are assigned to the same apparatus parts as in the OFDM demodulators of the first and second embodiments and these parts are omitted from the following description.

As shown in FIG. 6, the OFDM demodulator of this embodiment includes a transmission information detector 603.

A maximum-likelihood symbol decision circuit 601 sets some of the subcarriers to zero based on the modulation scheme and error correction coding rate (convolutional coding rate in this embodiment) of a carrier, generates a replica signal based on a channel response value from a channel estimator 102, and selects a symbol that maximizes the likelihood of the replica signal being equivalent to a digital signal stored in a data storage 104.

Figure 7:
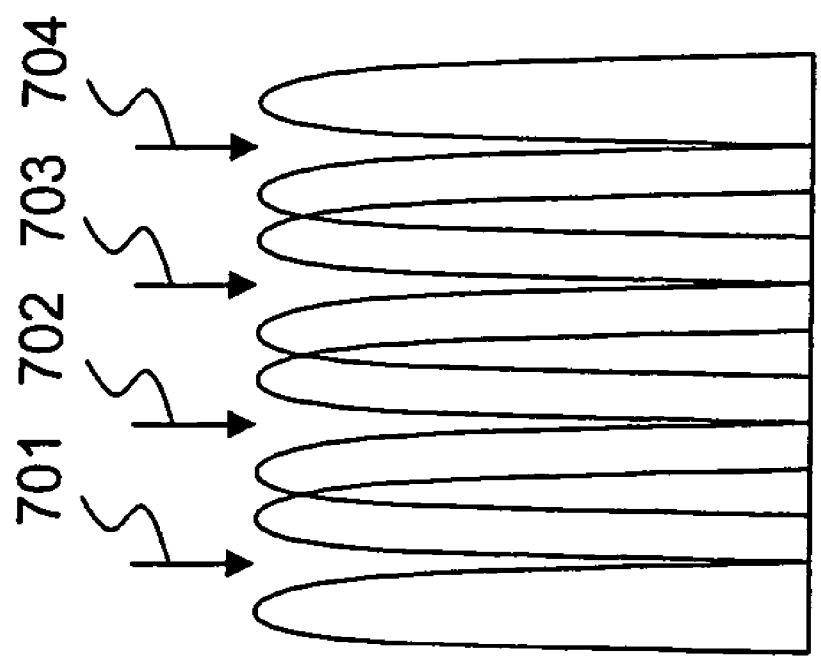
FIG. 7 is a diagram showing a situation where a symbol generator shown in FIG. 6 sets subcarriers at zero.

A symbol generator 602 obtains transmission information from the transmission information detector 603 and sets to zero the values of a predetermined number of subcarriers among the plurality of subcarriers included in the OFDM symbol, in accordance with the transmission information. Here, the "transmission information" signifies, for example, the carrier modulation scheme and the convolutional coding rate. By way of example, the symbol generator 602 sets every third subcarrier to zero as shown in FIG. 7 (subcarriers 701 through 704). The transmission information detector 603 detects the transmission information included in the received signal based on the symbol determined by the maximum-likelihood symbol decision circuit 601.

Figure 8:
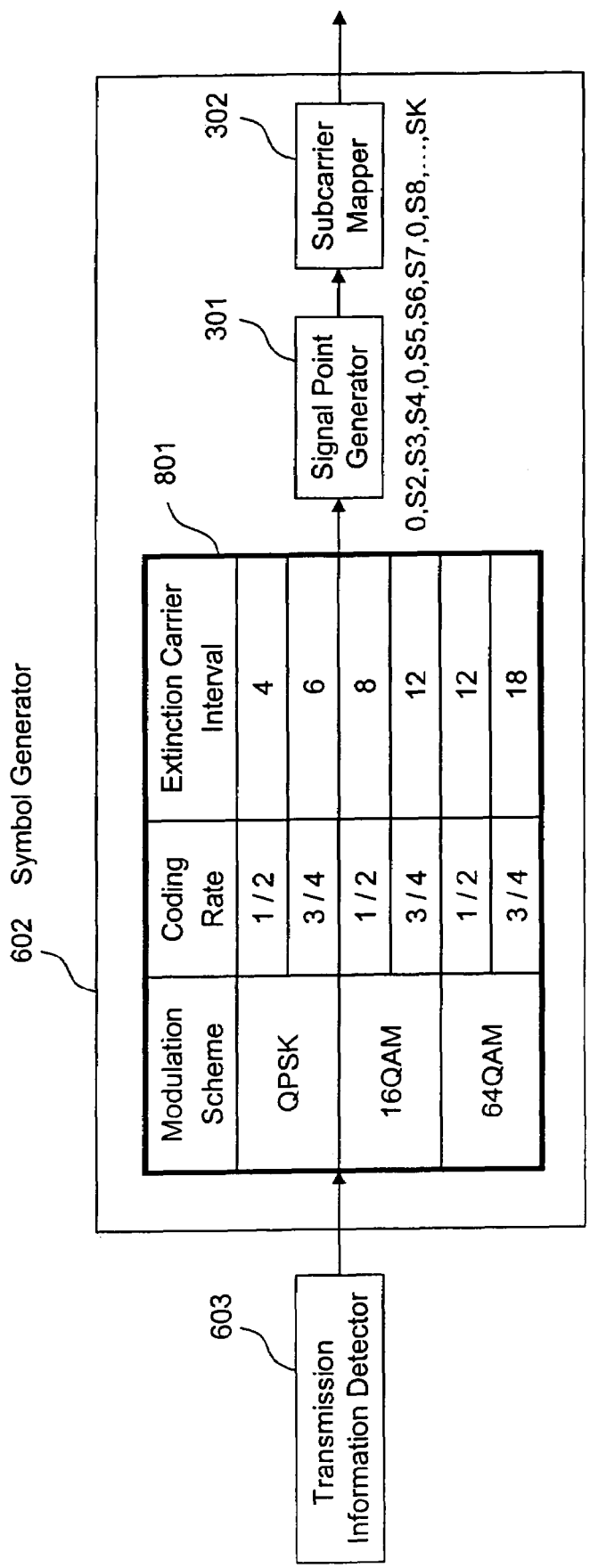
FIG. 8 is a block diagram of the symbol generator shown in FIG. 6.

FIG. 8 shows a detailed block diagram of the symbol generator 602, which includes an extinction carrier interval determiner 801, a signal point generator 301, and a subcarrier mapper 302. The extinction carrier interval determiner 801 determines an extinction carrier interval in accordance with the transmission information received from the transmission information detector 603. The determined extinction carrier interval has the relation of a monotonous increase to the modulation scheme, namely, a transmission rate, and it has the relation of a monotonous increase to the coding rate. In a case, for example, where the modulation scheme is the QPSK and where the coding rate is "½", the extinction carrier interval determiner 801 sets the extinction carrier interval at "4".

According to the third embodiment described above, the predetermined number of subcarriers are set to zero in accordance with the error correctability of the error correction decoder based on the transmission information items, such as the carrier modulation scheme and the error correction coding rate, whereby the number of the symbol candidates can be lessened to realize a reduction of a processing quantity.

Fourth Embodiment

FIG. 9 is a block diagram of a fourth embodiment that includes error correction decoding and data of subcarriers of low levels are extinguished by a channel estimator 102 to decrease a number of symbol candidates. Identical reference numerals are assigned to the same apparatus parts as in the OFDM demodulators of the first and second embodiments and these parts are omitted from the following description. As shown in FIG. 9, the OFDM demodulator of the fourth embodiment differs from the foregoing embodiments in the configuration of a maximum-likelihood symbol decision circuit 901.

The maximum-likelihood symbol decision circuit 901 sets the value of a certain subcarrier to zero based on a channel response from the channel estimator 102 and thereafter generates a replica signal based on a channel response value from the channel estimator 102. The maximum-likelihood symbol decision circuit 901 selects a symbol that maximizes a likelihood of the replica signal being equivalent to a digital signal stored in a data storage 104.

A symbol generator 902 receives the channel response value estimated by the channel estimator 102 and sets to zero the values of subcarriers whose values are at or below a certain predetermined level, thereby to generate a symbol. By way of example, the channel response values of subcarriers 1001 and 1002 shown in FIG. 10 are not greater than the predetermined level, so the symbol generator 902 generates the symbol by setting the values of these subcarriers to zero.

FIG. 11 is a block diagram of the symbol generator 902, which includes an extinction subcarrier selector 1101, a subcarrier level threshold setter 1102, a signal point generator 301 and a subcarrier mapper 302.

Figures 11A, 11B:
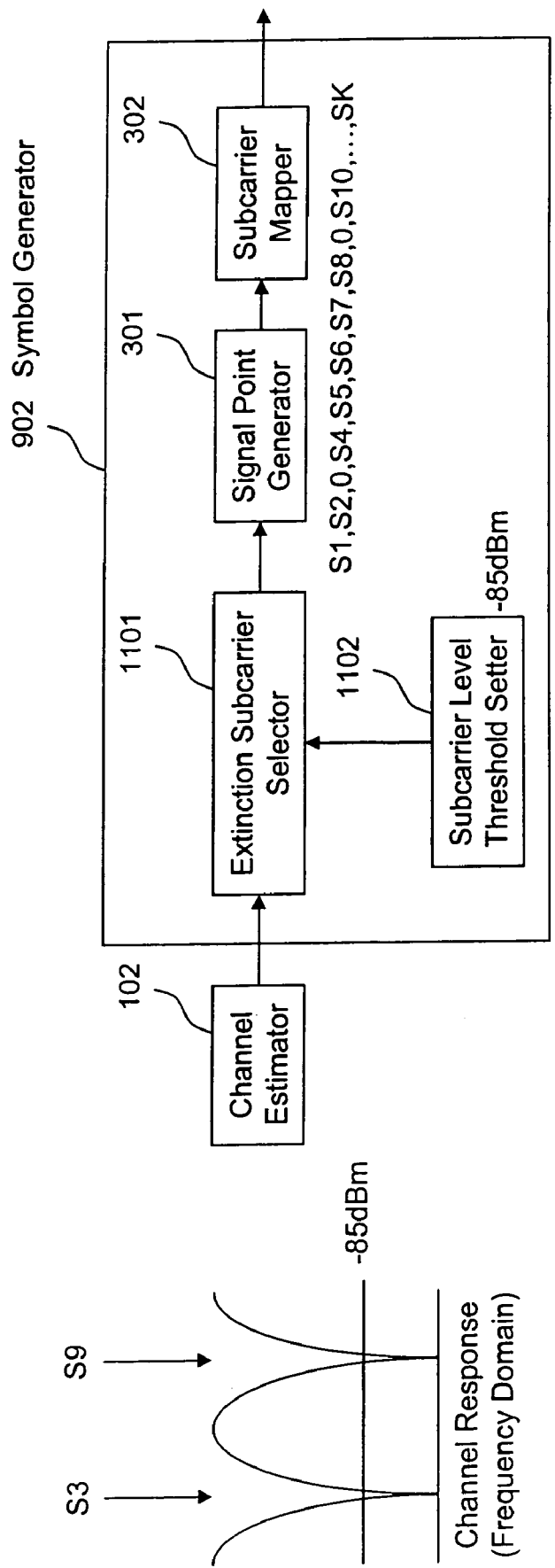
FIG. 11A is an example waveform used in the OFDM demodulator of FIG. 9.
FIG. 11B is a block diagram of the symbol generator shown in FIG. 9.

The extinction subcarrier selector 1101 receives the channel response values of individual subcarriers from the channel estimator 102, and extinguishes the subcarriers whose channel response values are at or below a threshold value (for example, −85 dBm) as shown in FIG. 11A. In a case where the channel estimator 102 has outputted a channel response shown in FIG. 11B, subcarriers S3 and S9 are not greater than −85 dBm, and hence, the extinction subcarrier selector 1101 extinguishes these subcarriers. That is, the extinction subcarrier selector 1101 sets the signal points of the subcarriers S3 and S9 to "0".

The subcarrier level threshold setter 1102 sets the threshold value which is compared with the channel response values in the extinction subcarrier selector 1101. In the example of FIG. 11A, the subcarrier level threshold setter 1102 sets the threshold value at −85 dBm. This threshold value is determined depending upon a propagation environment, the performance of the OFDM demodulator, etc., by a simulation, an experiment or the like.

According to the fourth embodiment described above, the subcarriers at or below the predetermined level are set to zero because subcarriers having channel response values less than the predetermined level exert little influence on the calculations of their likelihoods of being equivalent to the received signal. Thus, the likelihood calculations are not affected, and the number of the symbol candidates lessens, so that a processing quantity is reduced.

Fifth Embodiment

Figure 12:
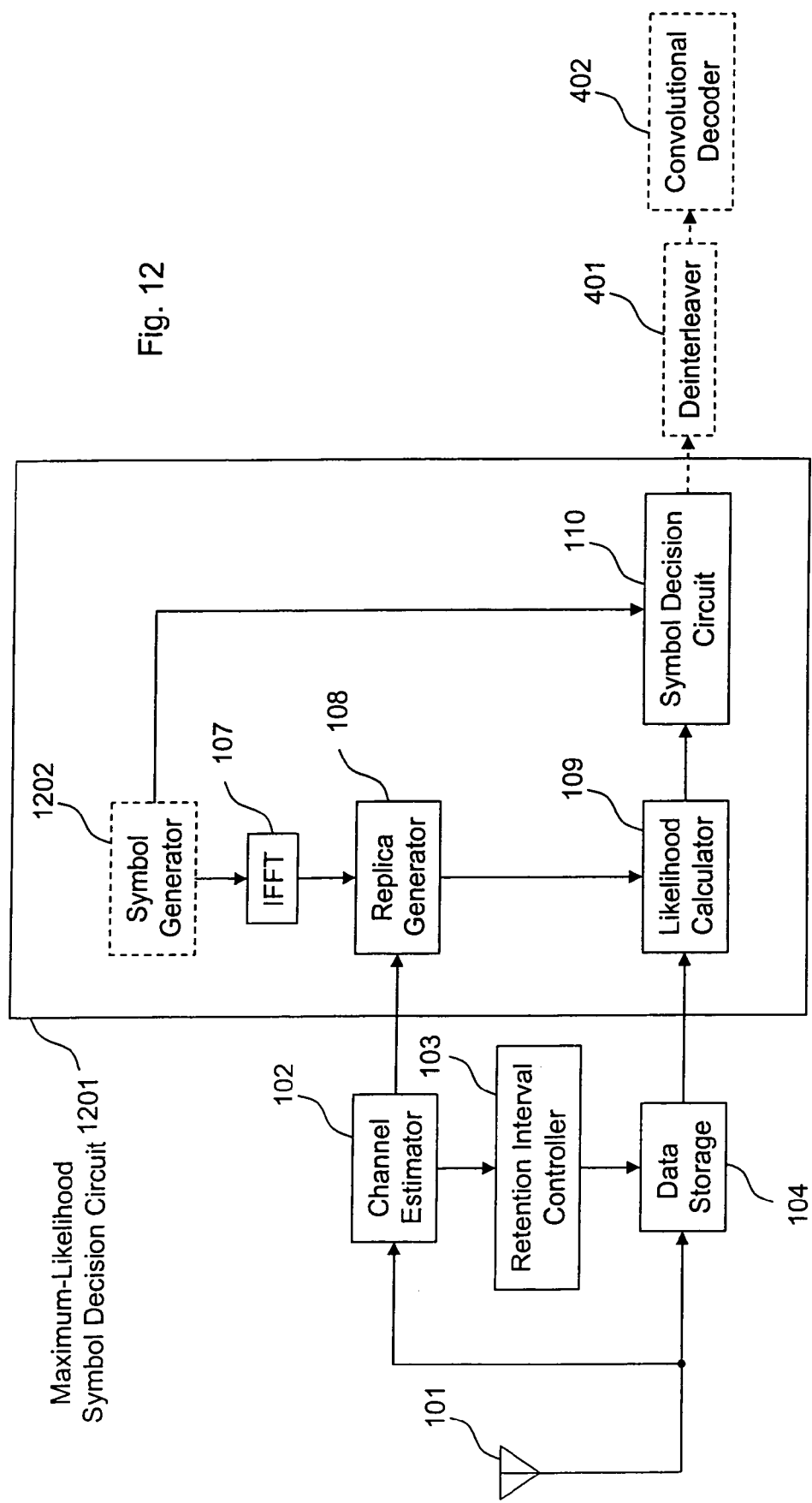
FIG. 12 is a block diagram of an OFDM demodulator according to a fifth embodiment of the invention.

FIG. 12 is a block diagram of an OFDM demodulator according to a fifth embodiment, which replaces a signal point of small amplitude with another signal point, in accordance with the capability of error corrections, thereby to decrease the number of symbol candidates. Identical reference numerals are assigned to the same apparatus parts as in the OFDM demodulators of the first and second embodiments and these parts are omitted from the description below. As shown in FIG. 12, the OFDM demodulator of this embodiment differs from the foregoing embodiments in the configuration of a maximum-likelihood symbol decision circuit 1201.

The maximum-likelihood symbol decision circuit 1201 lowers the precision of signal point candidates of small amplitudes among the signal point candidates of individual subcarriers, so as to generate a symbol candidate, and the maximum-likelihood symbol decision circuit 1201 generates a replica signal based on the symbol candidate and a channel response from a channel estimator 102, so as to select a symbol which maximizes the likelihood of a replica signal being equivalent to a digital signal stored in a data storage 104.

Figure 13:
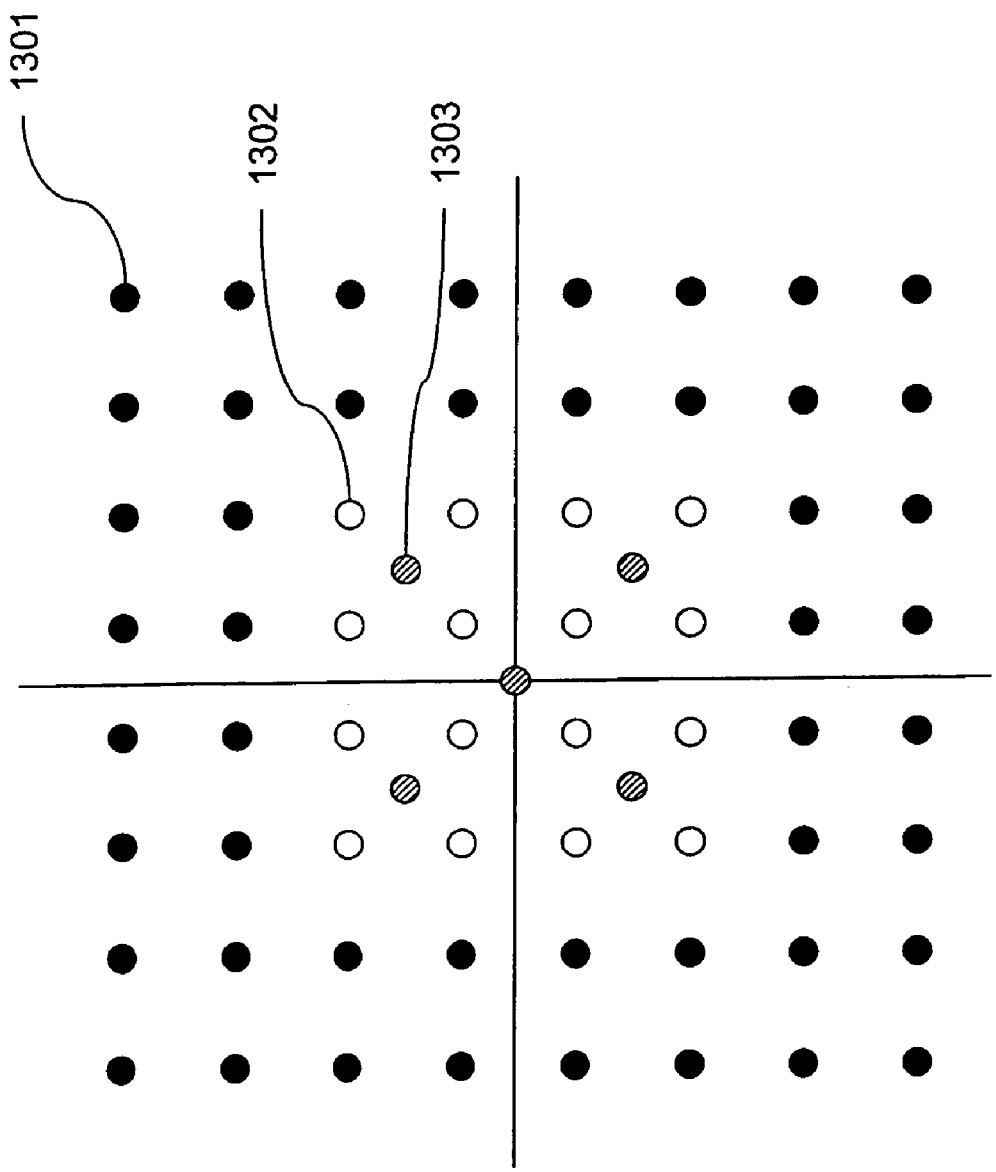
FIG. 13 is a diagram showing a situation where a symbol generator shown in FIG. 12 lowers the precision of signal point candidates of small amplitudes.

A symbol generator 1202 lowers the precision of signal point candidates of small amplitudes among the signal point candidates of individual subcarriers. That is, the symbol generator 1202 replaces the plurality of signal points of small amplitudes with a smaller number of signal points having the same extent of amplitudes. By way of example, the symbol generator 1202 replaces small-amplitude signal point candidates shown by white circles in FIG. 13, with signal point candidates shown by hatched circles. In this example, there are 16 white circle signal point candidates and 5 hatched circle signal point candidates.

Figure 14B:
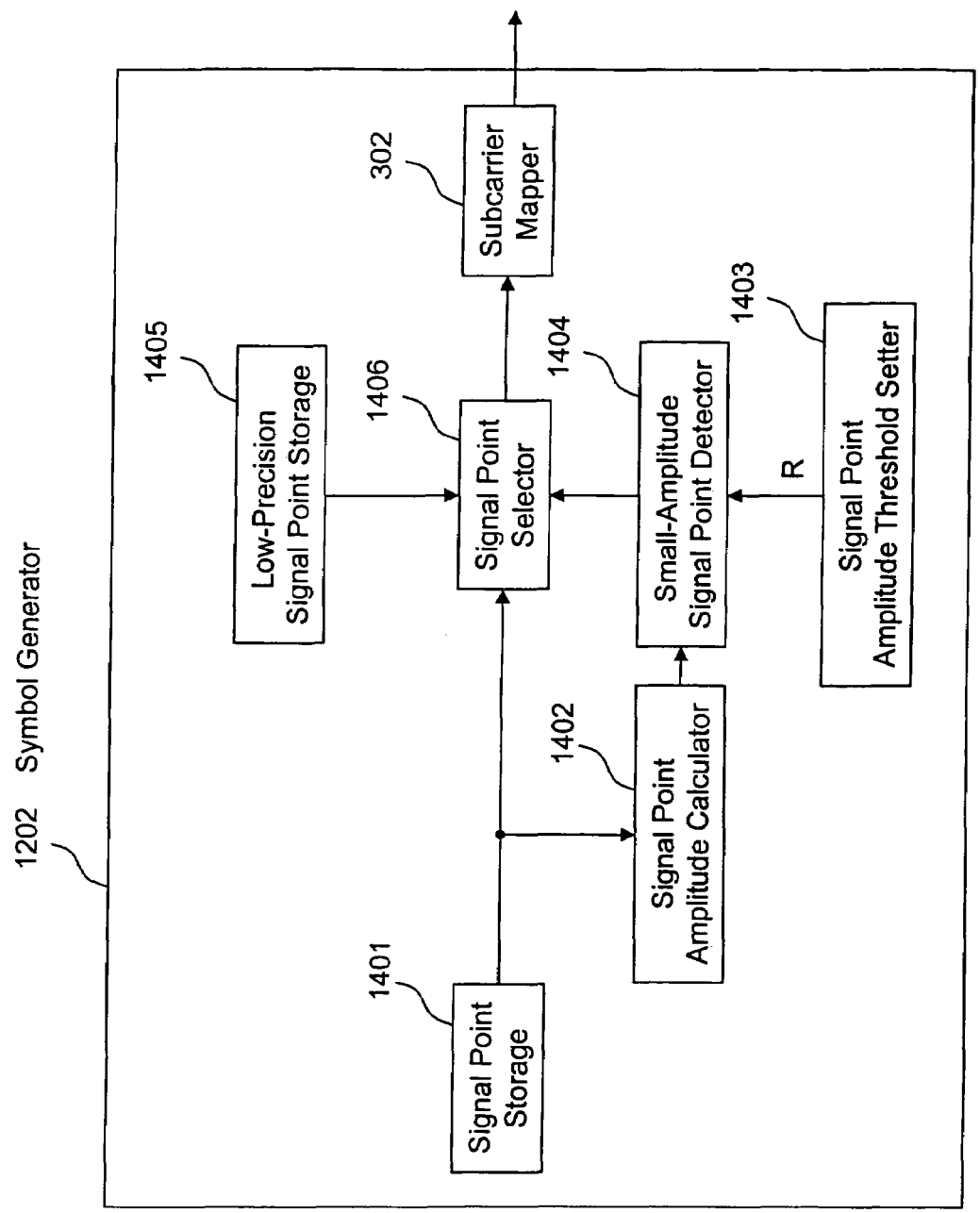
FIG. 14B is a block diagram of the symbol generator shown in FIG. 12.
Figure 14A:
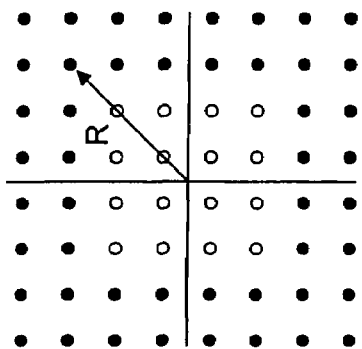
FIG. 14A is a subcarrier diagram used in FIG. 14B.

FIG. 14A is a diagram showing replaced signal point candidates and FIG. 14B is a detailed block diagram of the symbol generator 1202, which includes a signal point storage 1401, a signal point amplitude calculator 1402, a signal point amplitude threshold setter 1403, a small-amplitude signal point detector 1404, a low-precision signal point storage 1405, a signal point selector 1406 and a subcarrier mapper 302.

The signal point storage 1401 retains signal points corresponding to a modulation scheme (for example, the signal points of the 64 QAM). The signal point amplitude calculator 1402 calculates the amplitudes of the signal points corresponding to the modulation scheme. The signal point amplitude threshold setter 1403 sets the amplitude threshold value (R) of the signal points. The small-amplitude signal point detector 1404 receives the amplitude threshold value (R) of the signal points and the amplitudes of the signal points corresponding to the modulation scheme, so as to detect the signal points whose amplitudes are smaller than the threshold value (R).

In a case where the amplitudes of the signal points are smaller than the threshold value (R: FIG. 14A), the low-precision signal point storage 1405 stores signal points of low precision to replace the small-amplitude signal points. The signal point selector 1406 replaces the small-amplitude signal points detected by the small-amplitude signal point detector 1404 with the low-precision signal points stored in the low-precision signal point storage 1405, and then outputs the low-precision signal points. The signal point selector 1406 outputs the other signal points equal to or greater than the threshold value (R) without being replaced.

According to the fifth embodiment described above, the precision of signal point candidates of small amplitudes is lowered because the small-amplitude signal points exert little influence on the calculations of a likelihood of equivalence to the received signal. Thus, the number of the symbol candidates can be lessened without affecting the likelihood calculations. Accordingly, the OFDM demodulator of this embodiment permits the reduction of a processing quantity.

Sixth Embodiment

Figure 15:
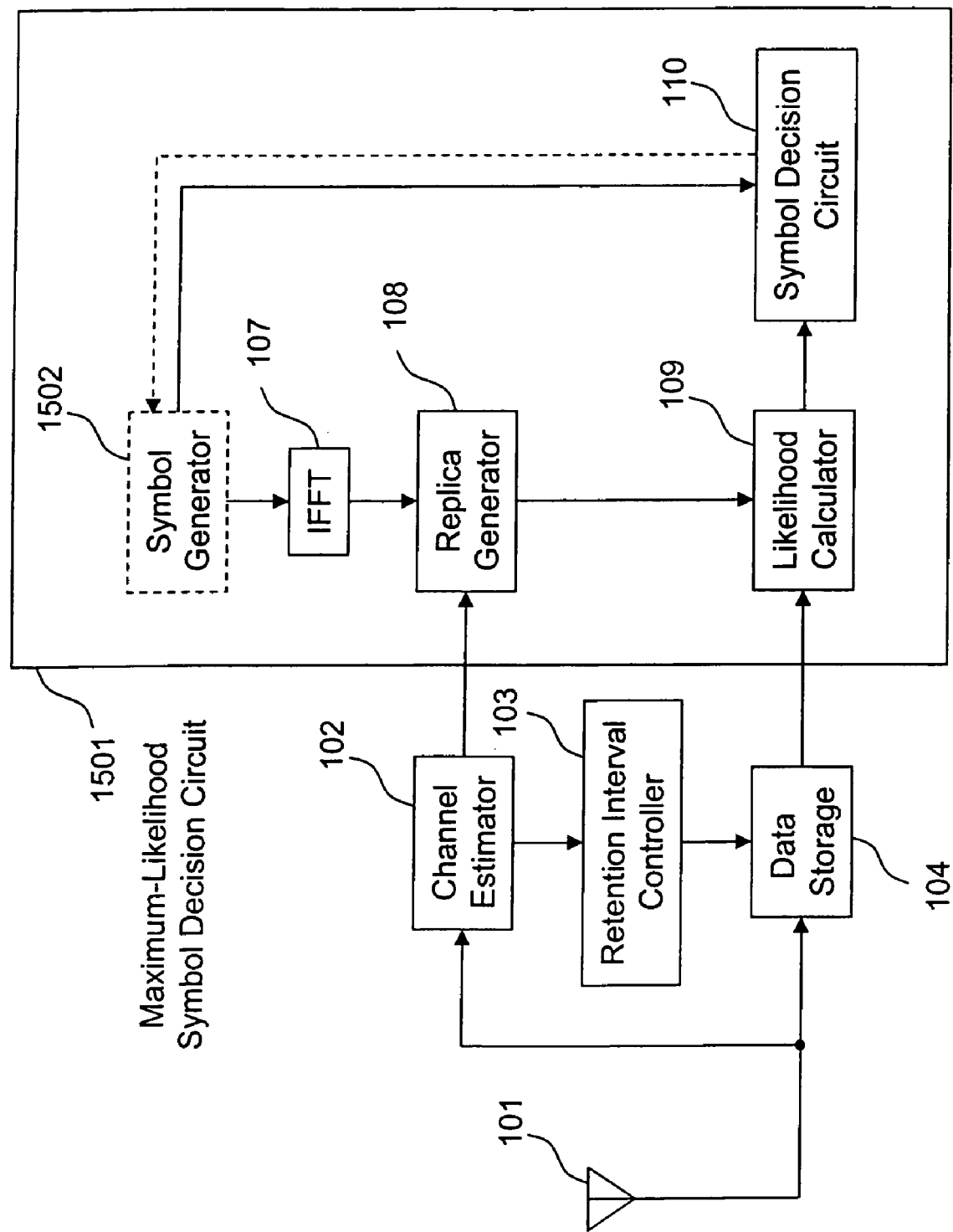
FIG. 15 is a block diagram of an OFDM demodulator according to a sixth embodiment of the invention.

FIG. 15 is a block diagram of an OFDM demodulator according to a sixth embodiment that finds a region where, among a plurality of signal points corresponding to a modulation scheme, signal points which are greatly influential on the calculations of their likelihoods are existent, thereby to decrease the number of symbol candidates. Identical reference numerals are assigned to the same apparatus parts as in the OFDM demodulator of the first embodiment and these parts are omitted from the following description.

As shown in FIG. 15, the OFDM demodulator of this embodiment differs from the first embodiment in only a symbol generator 1502. The symbol generator 1502 first sets several tentative signal points in each of certain regions and as signal points representative of the region, for each subcarrier, and it generates symbol candidates for the tentative signal points at a first granularity (as a first stage). A symbol decision circuit 110 selects signal points corresponding to a symbol decision value (that is, a value which indicates a symbol whose likelihood becomes the maximum) for the generated symbol candidates. Besides, the symbol generator 1502 generates symbol candidates on the basis of signal points which are included in a region corresponding to the selected signal points at a second granularity finer than the first granularity (as a second stage).

Figure 16B:
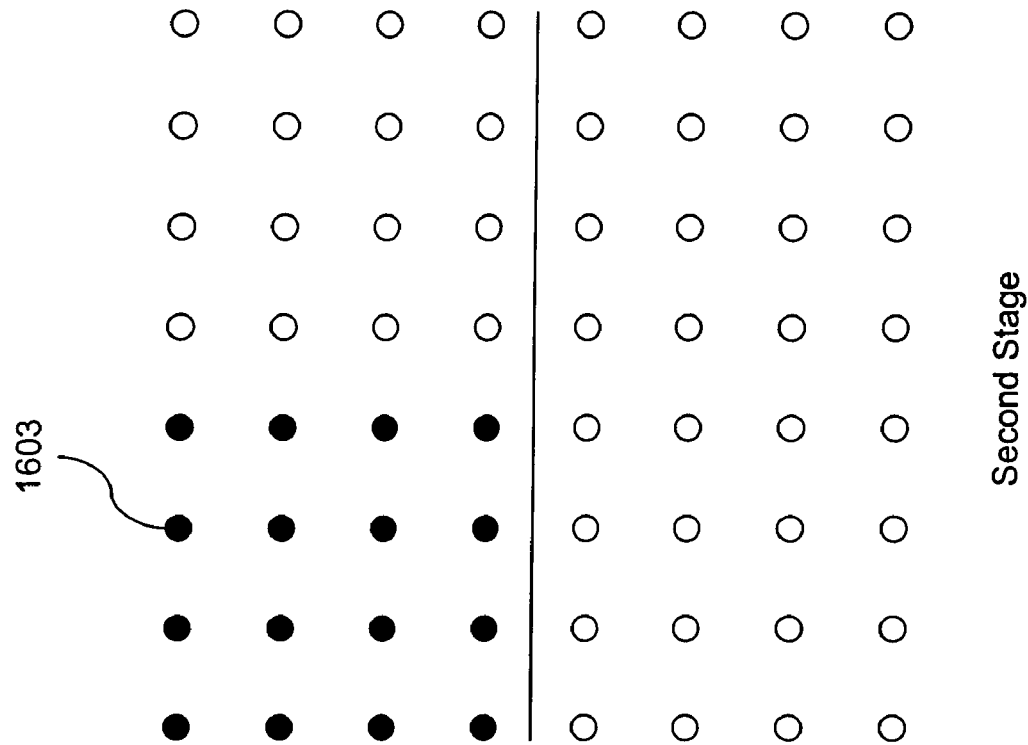
FIGS. 16A and 16B are a diagrams showing an example in which a symbol generator shown in FIG. 15 decreases symbol candidates in two stages.
Figure 16A:
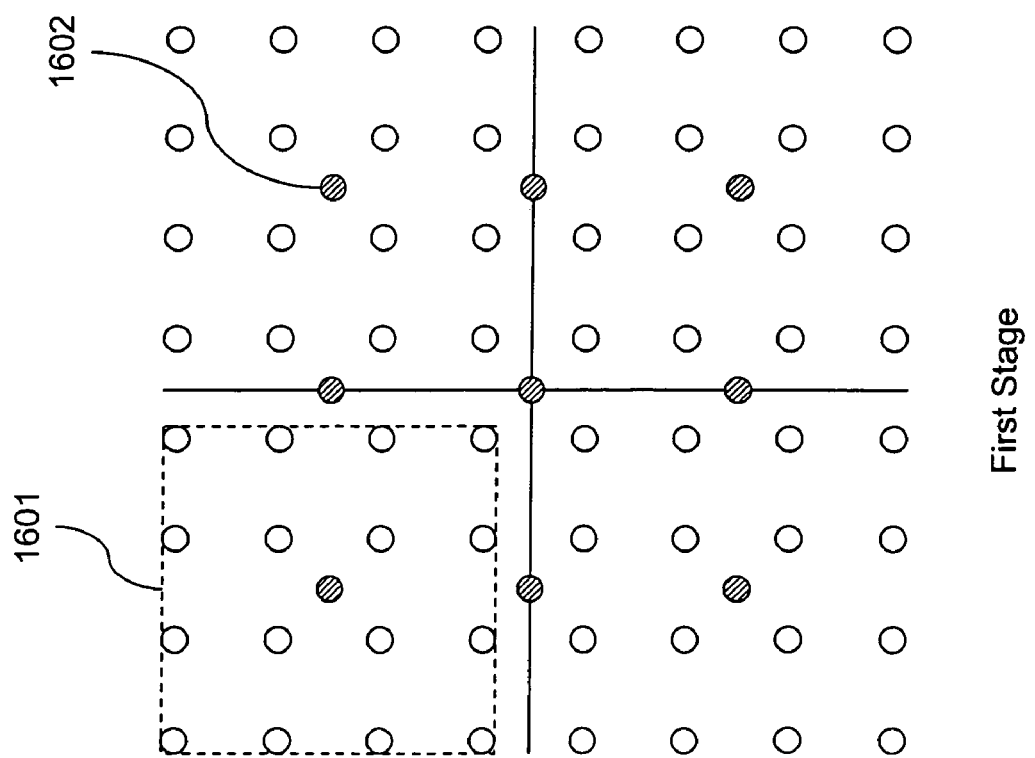

FIGS. 16A and 16B show an example of the sixth embodiment. At the first stage, in FIG. 16A, the symbol generator 1502 generates symbol candidates for nine representative signal points 1602 in every subcarrier. The symbol decision circuit 110 selects that one of the generated symbol candidates whose likelihood becomes the maximum, and it selects sixteen signal points which lie in a region corresponding to the selected symbol candidate. In the second stage, shown in FIG. 16B, the symbol generator 1502 generates symbol candidates based on the selected sixteen signal points.

There are also other techniques by which the symbol generator 1502 decreases the number of signal points. Here, the techniques will be described in conjunction with two examples shown in FIGS. 17 and 18.

The symbol generator 1502 first sets several tentative signal points in each of certain regions and as signal points representative of the region, for each subcarrier, and generates symbol candidates for the tentative signal points (as a first stage). A symbol decision circuit 110 selects signal points corresponding to a symbol decision value (that is, a value which indicates a symbol whose likelihood becomes the maximum) for the generated symbol candidates. Further, the symbol generator 1502 sets several tentative signal points as signal points which represent the region of the selected signal points, and generates symbol candidates on the basis of these signal points (as a second stage). Again, the symbol decision circuit 110 selects signal points which correspond to a symbol decision value for the generated symbol candidates. Besides, the symbol generator 1502 generates symbol candidates based on the signal points that are included in a region corresponding to the selected signal points (as a third stage).

EXAMPLE 1

FIGS. 17A-C show a first example. In a first stage, in FIG. 17A, a symbol generator 1502 generates symbol candidates for nine representative signal points 1702 for each subcarrier. Subsequently, in a second stage shown in FIG. 17B, the symbol generator 1502 selects that one of the generated symbol candidates whose likelihood becomes the maximum, and selects nine signal points 1704 that represent a region 1701 corresponding to the selected symbol candidate. Further, the symbol generator 1502 selects a symbol candidate whose likelihood becomes the maximum, among symbol candidates generated for the nine signal points 1704, and selects four signal points 1705 which lie in a region 1703 corresponding to the selected symbol candidate. In a third stage, shown in FIG. 17C, the symbol generator 1502 generates symbol candidates based on the selected four signal points.

EXAMPLE 2

FIGS. 18A-18C show a second example. In a first stage, shown in FIG. 18A, the symbol generator 1502 generates symbol candidates for four representative signal points 1802 in each subcarrier. Subsequently, in a second stage shown in FIG. 18B, the symbol generator 1502 selects one of the generated symbol candidates whose likelihood becomes the maximum, and selects four signal points 1804 that represent a region 1801 corresponding to the selected symbol candidate. Further, the symbol generator 1502 selects a symbol candidate whose likelihood becomes the maximum, among symbol candidates generated for the four signal points 1804, and selects four signal points 1805 that lie in a region 1803 corresponding to the selected symbol candidate. In a third stage, shown in FIG. 18C, the symbol generator 1502 generates symbol candidates based on the selected four signal points.

Figure 19:
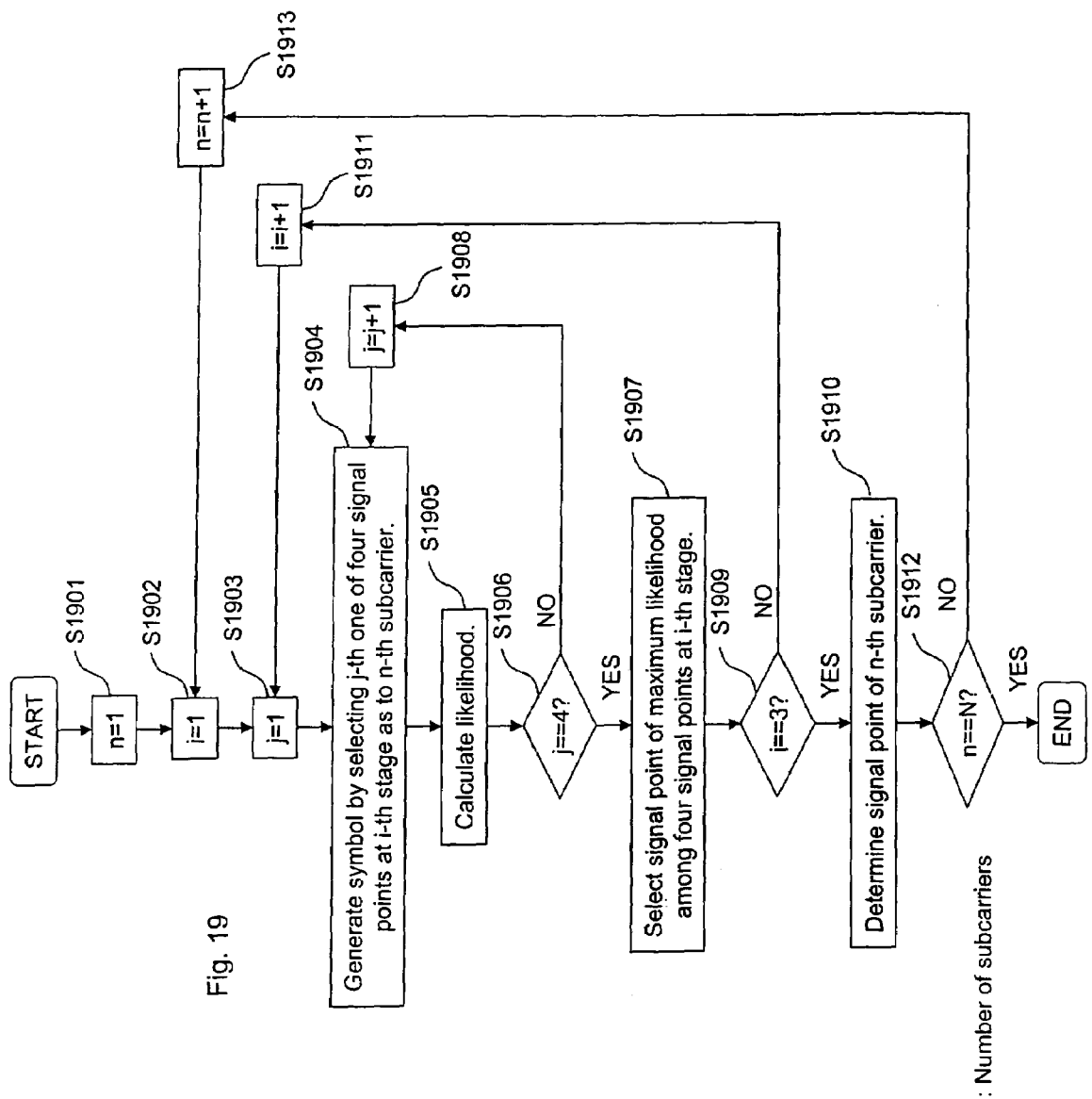
FIG. 19 is a flow chart for explaining an operation to which the symbol generator shown in FIG. 15 pertains.

FIG. 19 is a flow diagram of an example operation of the symbol generator 1502 in FIG. 18. As to a first (n=1) subcarrier (step S1901), among four signal points 1802 at a first stage (step S1902), a first signal point (step S1903) is selected to generate a symbol candidate (step S1904). An IFFT 107 performs an inverse Fourier transform, a replica generator 108 generates a replica signal, and a likelihood calculator 109 computes the likelihood of the replica signal being equivalent to a digital signal outputted from a data storage 104 (step S1905). Regarding the second through fourth of the four signal points 1802, likelihoods are computed similarly to that of the first signal point (steps S1906, S1908, S1904, and S1905).

At step S1907, the signal point of the maximum likelihood among the four signal points 1802 at the first stage is selected. In this example, the signal point of the maximum likelihood is the signal point which is included in a region 1801. Besides, the operation proceeds to a second stage at step S1911. In this case, the region 1801 which includes signal points lying in a second quadrant is selected. Further, steps S1903 through S1908 are executed for four signal points 1804.

At step S1907, the signal point of the maximum likelihood among the four signal points 1804 at the second stage is selected. In this example, the signal point of the maximum likelihood is the signal point which is included in a region 1803. In this case, the region 1803 within the second quadrant is selected. As a result, the signal point of the first subcarrier is determined as the signal point of the maximum likelihood among four signal points 1805.

Steps S1902 through S1911 of the above operation are also performed for an nth (n being a natural number) subcarrier. (Step S1912), whereby the signal point of the nth subcarrier can be determined (Step S1910).

According to the OFDM demodulator of the sixth embodiment described above, the symbol candidates to be subsequently set are determined in accordance with the symbol decision value corresponding to the set symbol candidates, whereby the region of the symbol candidates can be gradually narrowed, and hence, the number of the symbol candidates is reduced. Accordingly, the OFDM demodulator of this embodiment permits the reduction of a processing quantity.

Seventh Embodiment

Figure 20:
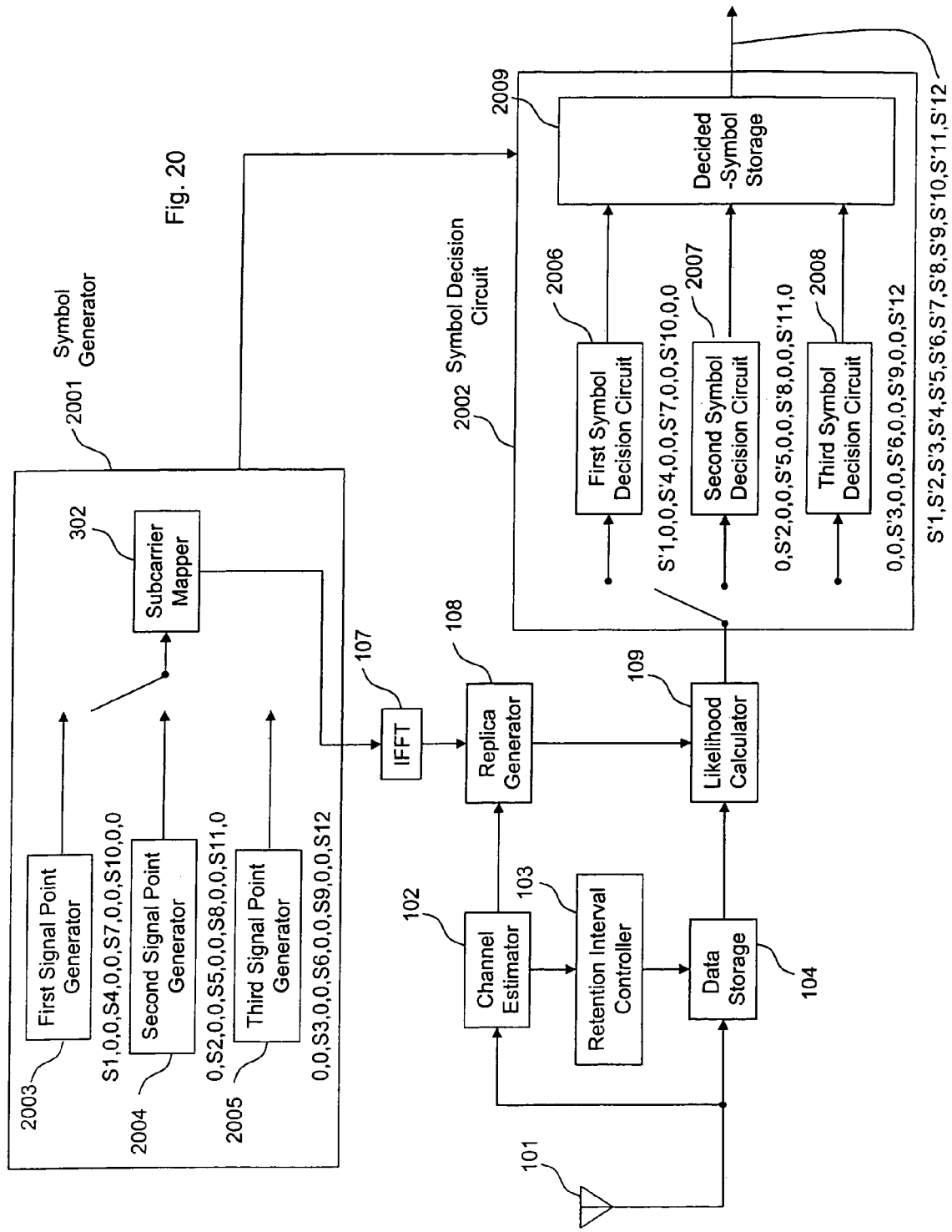
FIG. 20 is a block diagram of an OFDM demodulator according to a sixth embodiment of the invention.

FIG. 20 is a block diagram of an OFDM demodulator according to a sixth embodiment that divides a plurality of subcarriers into a plurality of groups and renders a symbol decision every group. Identical reference numerals are assigned to the same apparatus parts as in the OFDM demodulator of the first embodiment and are omitted from the following description.

As shown in FIG. 20, the OFDM demodulator of this embodiment differs from the first embodiment in only a symbol generator 2001 and a symbol decision circuit 2002. The symbol generator 2001 includes first, second and third signal point generators 2003, 2004 and 2005, and a subcarrier mapper 302. The symbol decision circuit 2002 includes first, second and third symbol decision circuits 2006, 2007 and 2008, and a decided-symbol storage 2009.

Figure 21A:
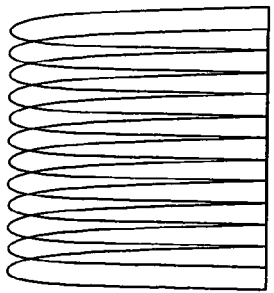
FIGS. 21A-21D are diagrams showing a situation where a symbol generator divides an OFDM symbol into a plurality of subcarrier groups.
Figure 21B:
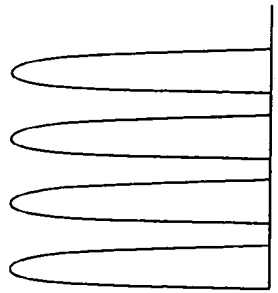
Figure 21C:
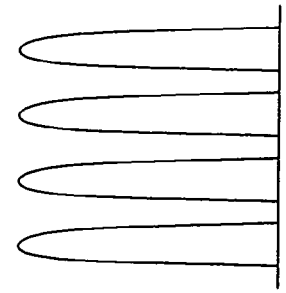
Figure 21D:
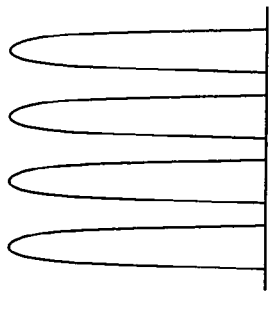

The symbol generator 2001 divides an OFDM symbol (for example, 2101 in FIG. 21A) into a plurality of subcarrier groups (for example, 2102, 2103 and 2104 in FIGS. 21B, 21C and 21D, respectively) and generates symbol candidates corresponding to the respective subcarrier groups. The symbol decision circuit 2002 selects the maximum-likelihood symbols of individual subcarriers for the respective subcarrier groups.

The first, second and third signal point generators 2003, 2004 and 2005 generate only signal points for the specified subcarriers, respectively. The subcarrier mapper 302 maps the signal points generated by the respective signal point generators, in the corresponding subcarriers.

The first, second and third symbol decision circuits 2006, 2007 and 2008 select the maximum-likelihood symbols of the subcarriers for the respective subcarrier groups. The decided-symbol storage 2009 stores therein the maximum-likelihood symbols of the subcarriers included in the respective subcarrier groups.

For example, assume that there are 12 subcarriers of the OFDM symbol (i.e., subcarriers S1 through S12). In this case, the first signal point generator 2003 generates signal points for a first subcarrier group (subcarriers S1, 0, S4, 0, 0, S7, 0, 0, S10, 0, 0), the second signal point generator 2004 generates signal points for a second subcarrier group (subcarriers 0, S2, 0, 0, S5, 0, 0, S8, 0, 0, S11, 0), and the third signal point generator 2005 generates signal points for a third subcarrier group (subcarriers 0, 0, S3, 0, 0, S6, 0, 0, S9, 0, 0, S12).

The first, second and third symbol decision circuits 2006, 2007 and 2008 operate in correspondence with the respective subcarrier groups, so as to render symbol decisions. As shown in the example of FIG. 20, when the signal points are generated from the kth signal point generator, the kth symbol decision circuit renders the symbol decision (k=1, 2 and 3).

Figure 22:
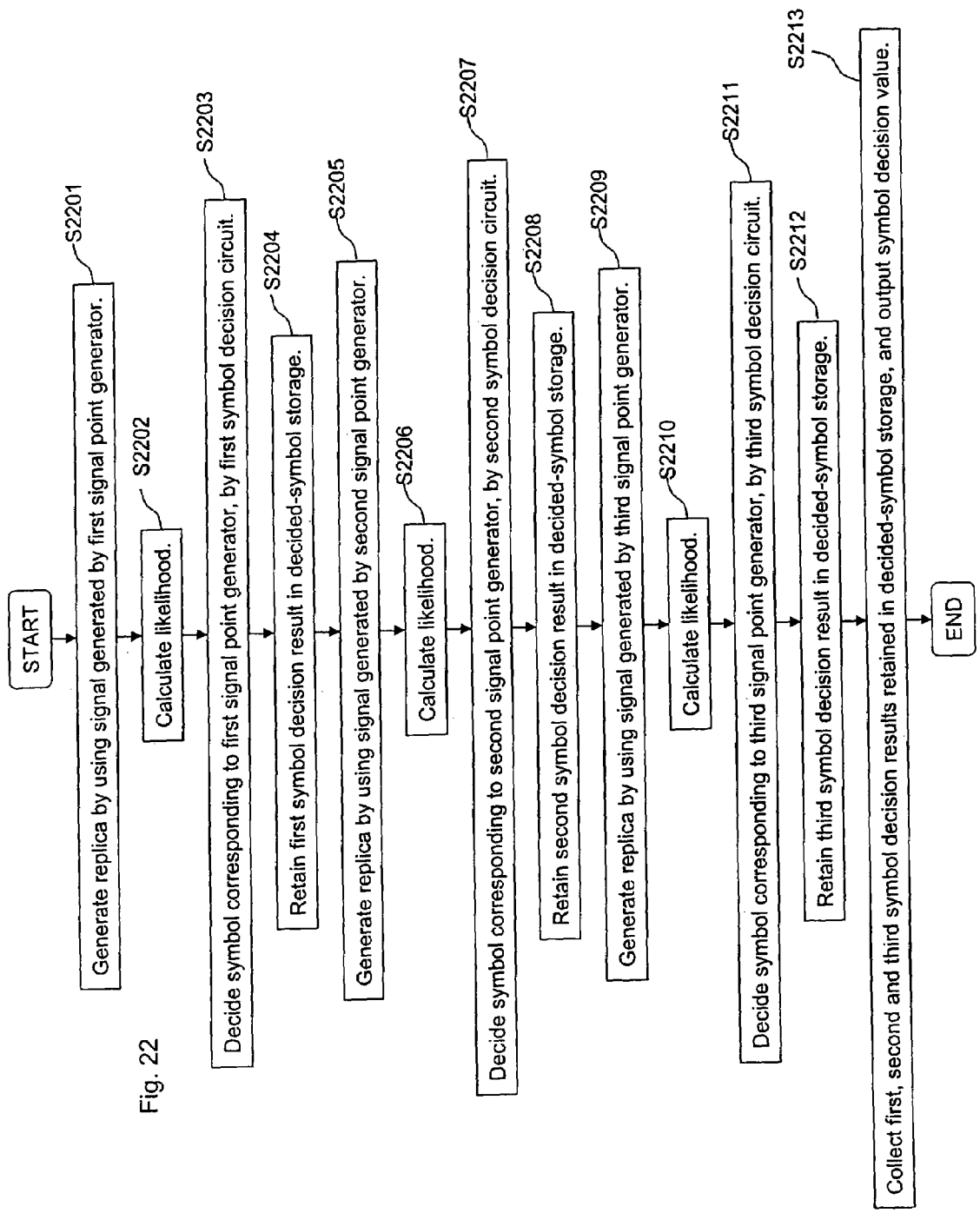
FIG. 22 is a flow chart showing an operation of the OFDM demodulator shown in FIG. 20.

FIG. 22 is a flow diagram of an example operation of the OFDM demodulator of the seventh embodiment. In this example, an upper layer selects the first signal point generator 2003 of the symbol generator 2001, and a replica generator 108 generates a replica signal by using a signal generated by the first signal point generator 2003 (step S2201). A likelihood calculator 109 calculates the likelihood that the replica signal is equivalent to a digital signal stored in a data storage 104 (step S2202). The upper layer selects the first symbol decision circuit 2006, and this first symbol decision circuit 2006 decides a symbol corresponding to the first signal point generator 2003, for each subcarrier (step S2203). The decided-symbol storage 2009 stores the decided result of the first symbol decision circuit 2006 therein (step S2204).

Likewise, processing proceeds in the second and third signal point generators 2004 and 2005 and the second and third symbol decision circuits 2007 and 2008 (steps S2205 through S2208, and steps S2209 through S2212).

Lastly, at step S2213, the decided results of the first, second and third symbol decision circuits 2006, 2007 and 2008, respectively, as stored in the decided-symbol storage 2009 are collectively outputted.

When the OFDM symbol is divided into the subcarrier groups for the computations in this manner, the number of states to be computed decreases, for example, from $4^{12}=16777216$ to $3 \times 4^4 = 768$ in a case where the OFDM symbol consists of twelve subcarriers and where a modulation scheme is the QPSK. In this manner, according to this embodiment, a processing quantity decreases exponentially.

According to the OFDM demodulator of the seventh embodiment described above, the OFDM symbol is divided into the plurality of subcarrier groups, whereby the number of symbol candidates is reduced, and hence, the processing quantity can be reduced.

Eighth Embodiment

Figure 23:
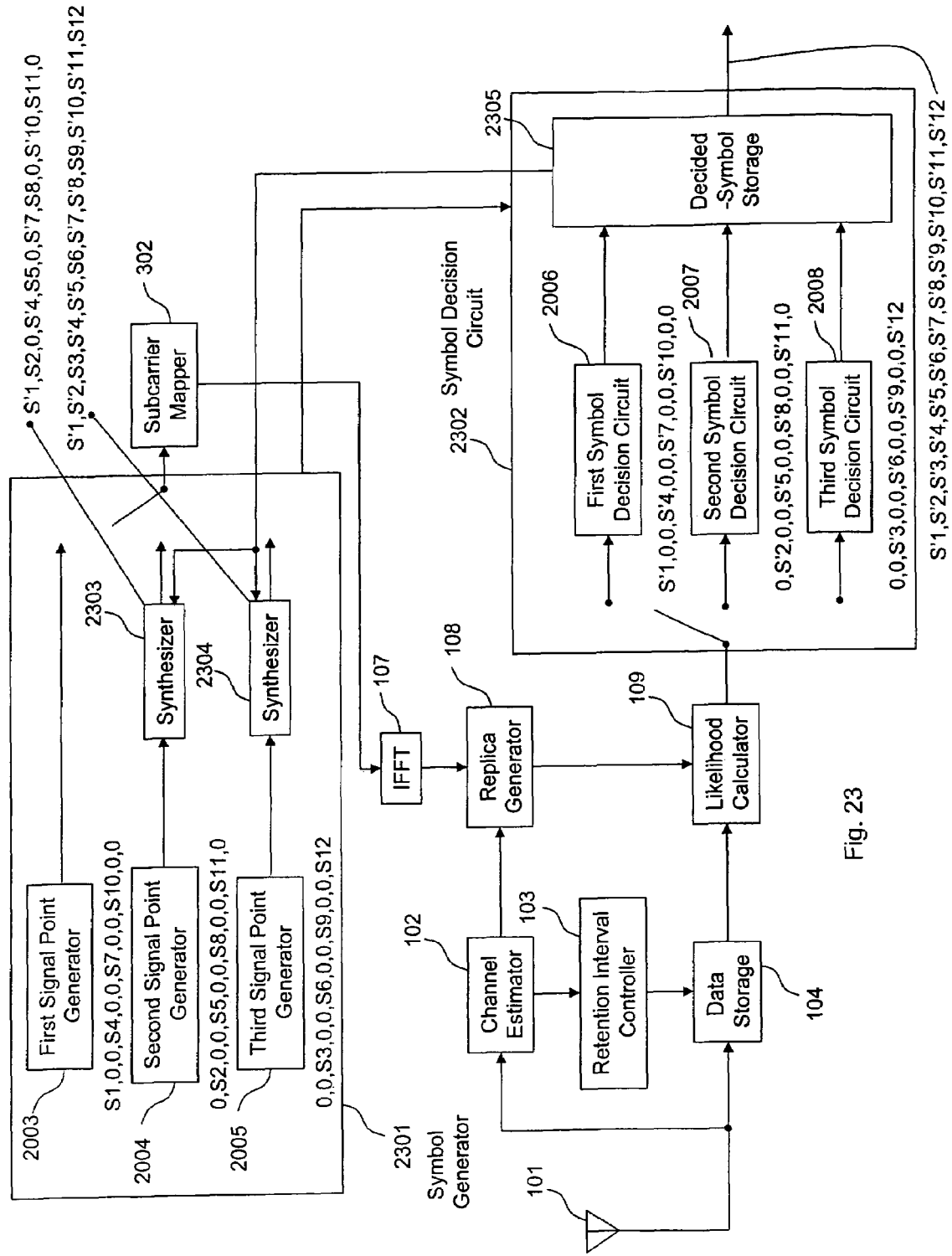
FIG. 23 is a block diagram of an OFDM demodulator according to an eighth embodiment of the invention.
Figure 24A:
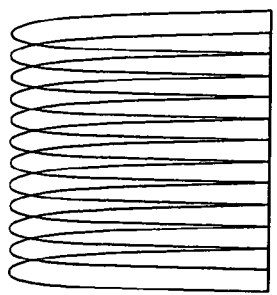
FIGS. 24A-24D are diagrams showing a situation where a symbol generator shown in FIG. 23 generates symbols.
Figure 24B:
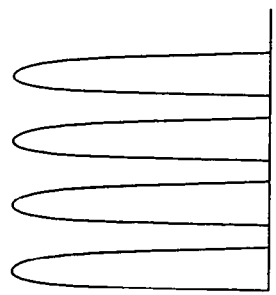
Figure 24C:
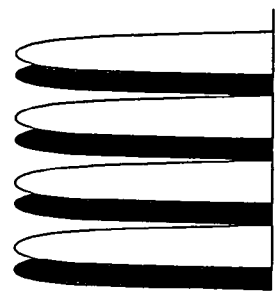
Figure 24D:
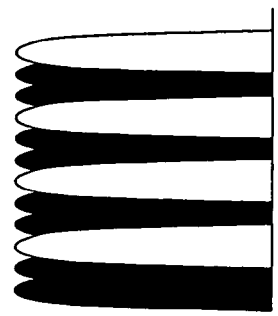

FIG. 23 is a block diagram of an OFDM demodulator according to an eighth embodiment that differs from that of the seventh embodiment in only the fact that previously obtained symbol decision results are used in generating the symbol candidates of the second and succeeding subcarrier groups. Identical reference numerals are assigned to the same apparatus parts as in the OFDM demodulators of the first and seventh embodiments, and these parts are omitted from the following description.

As shown in FIG. 23, the OFDM demodulator of this embodiment differs from that of the seventh embodiment in the following points: a symbol generator 2301 includes synthesizers 2303 and 2304, and a decided-symbol storage 2305 included in a symbol decision circuit 2302 outputs decided results to the synthesizers 2303 and 2304.

In this example, the symbol generator 2301 generates the signal points of the first subcarrier group of an OFDM symbol as in the seventh embodiment. Subsequently, in a case where the signal points of a certain subcarrier group of the OFDM symbol are to be generated and where the result of a symbol decision has existed as to another subcarrier group of the same OFDM symbol before, the signal points are generated so as to reflect the decision result.

FIGS. 21 and 24A-24D show an example of the eighth embodiment. In this example, an OFDM symbol (2401 in FIG. 24A) is divided into a plurality of subcarrier groups (2102, 2103 and 2104 in FIGS. 21B, 21C and 21D, respectively) and a symbol (2403 in FIG. 24C) corresponding to the second subcarrier group (2103 in FIG. 21C) of the same OFDM symbol is generated so as to reflect the symbol decision result of the signal points of the first subcarrier group (2102 in FIG. 21B). Further, a symbol (2404 in FIG. 24D) corresponding to the third subcarrier group (2104 in FIG. 21D) is generated so as to reflect the symbol decision results of the signal points of the first and second subcarrier groups (2102 and 2103 in FIGS. 21B and 21C, respectively).

Figure 25:
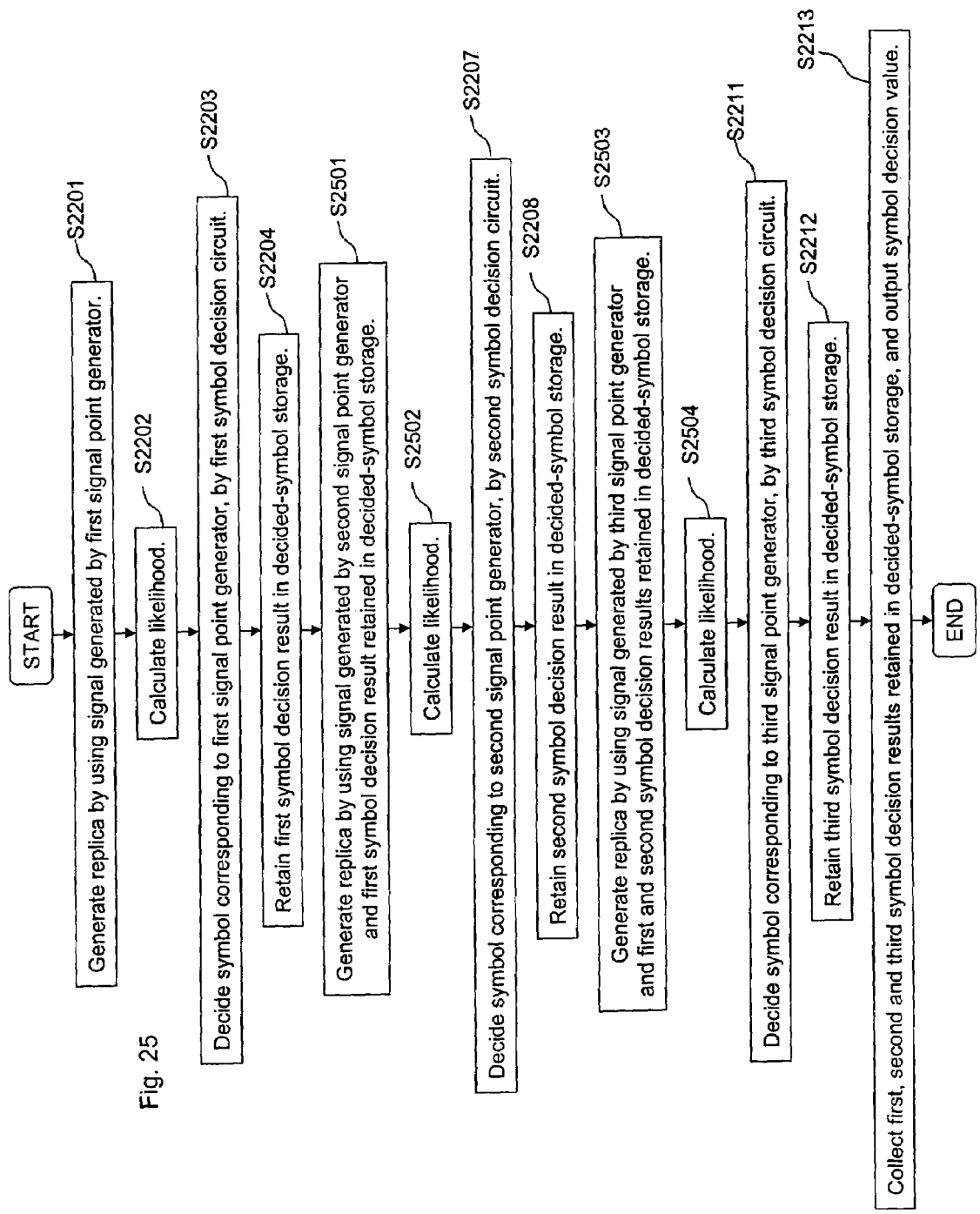
FIG. 25 is a flow chart showing an operation of the OFDM demodulator shown in FIG. 23.

FIG. 25 is a flow diagram of an example operation of the OFDM demodulator of the eighth embodiment. The same steps as those of the flow chart of FIG. 22 as indicated in the seventh embodiment are respectively denoted by identical reference signs and are omitted from the following description.

Steps S2201-S2204 are the same as in FIG. 22 showing the seventh embodiment. At step S2501, the synthesizer 2303 synthesizes signal points generated by the second signal point generator 2004, with a first symbol decision result obtained by the first symbol decision circuit 2006 as stored in the decided-symbol storage 2305, and the replica generator 108 generates a replica signal by utilizing the synthesized result. The likelihood calculator 109 calculates the likelihood that the replica signal is equivalent to a digital signal stored in the data storage 104 (step S2502).

At the next step S2503, the synthesizer 2304 synthesizes a signal generated by the third signal point generator 2005, with first and second symbol decision results respectively obtained by the first and second symbol decision circuits 2006 and 2007 as stored in the decided-symbol storage 2305, and the replica generator 108 generates a replica signal by utilizing the synthesized result. The likelihood calculator 109 calculates the likelihood that the replica signal is equivalent to the digital signal stored in the data storage 104 (step S2504).

According to the OFDM demodulator of the eighth embodiment described above, in a case where the signal points of a certain subcarrier group of an OFDM symbol are to be generated and where the result of a symbol decision has existed as to another subcarrier group of the same OFDM symbol before, the signal points are generated so as to reflect the decision result, whereby the decision precision of the signal points of the individual subcarriers of the subcarrier group can be enhanced more at a later decision.

Ninth Embodiment

Figure 26:
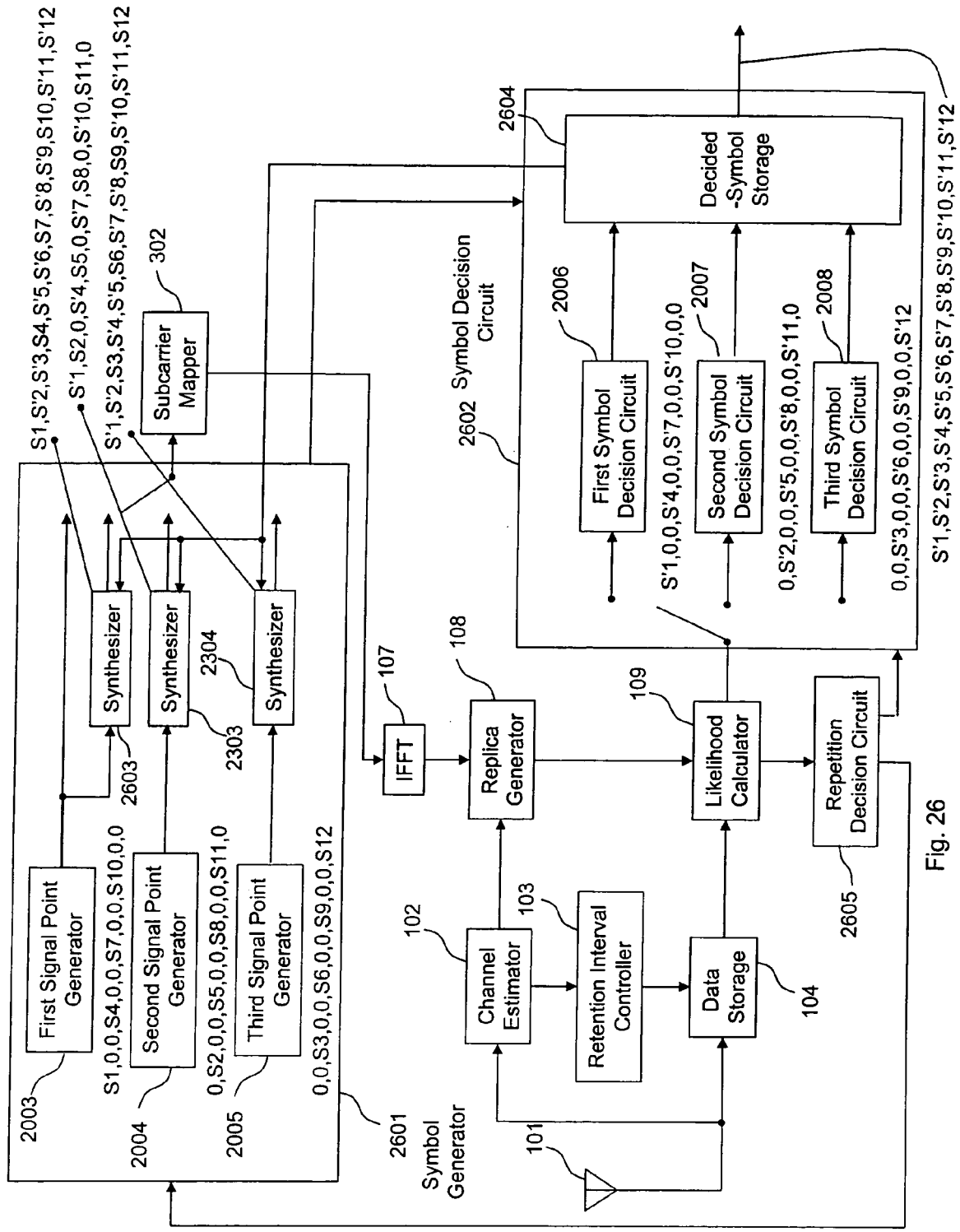
FIG. 26 is a block diagram of an OFDM demodulator according to a ninth embodiment of the invention.
Figure 27A:
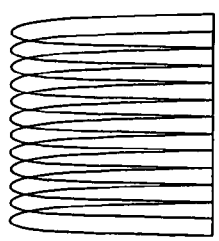
FIGS. 27A-27E are diagrams showing a situation where a symbol generator shown in FIG. 26 generates symbols.
Figure 27B:
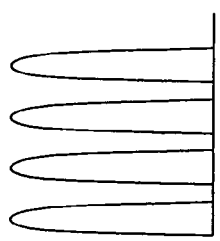
Figure 27C:
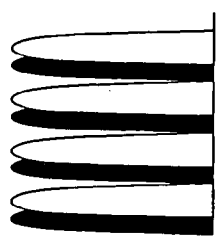
Figure 27D:
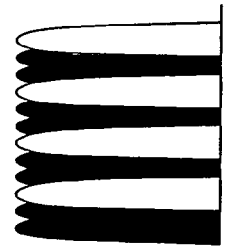
Figure 27E:
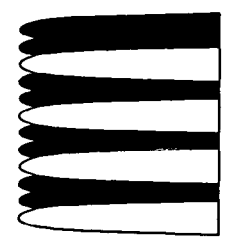

FIG. 26 is a block diagram of an OFDM demodulator according to a ninth embodiment that is the same as the OFDM demodulator of the eighth embodiment in the fact that, in generating the symbol candidates of the second and succeeding subcarrier groups, symbol decision results obtained before are utilized. However, the ninth embodiment differs from the eighth embodiment in the fact that symbol decisions are repeatedly rendered until the maximum likelihood calculated by the likelihood calculator 109 becomes greater than a predetermined value. Identical reference numerals are assigned to the same apparatus parts as in the OFDM demodulators of the first, seventh and eighth embodiments and are omitted from the following description.

As shown in FIG. 26, the OFDM demodulator of the ninth embodiment differs from that of the eighth embodiment in the following points: a synthesizer 2603 is included in a symbol generator 2601, a decided-symbol storage 2604 included in a symbol decision circuit 2602 outputs decided results to the synthesizer 2603, and a repetition decision circuit 2605 is included.

In a case where the signal points of a certain subcarrier group of an OFDM symbol are to be generated and where the result of a symbol decision has existed as to another subcarrier group of the same OFDM symbol before, the symbol generator 2601 generates the signal points so as to reflect the decision result.

The synthesizer 2603 synthesizes signal points generated by a first signal point generator 2003, with second and third symbol decision results respectively obtained by second and third symbol decision circuits 2007 and 2008 as stored in the decided-symbol storage 2604, and it outputs the synthesized result to a subcarrier mapper 302.

Unlike in the eighth embodiment, the decided-symbol storage 2604 outputs the symbol decision result also to the synthesizer 2603.

The repetition decision circuit 2605 refers to likelihoods calculated by the likelihood calculator 109, and decides whether or not the maximum one of the calculated likelihoods is greater than a preset threshold value. On condition that the maximum likelihood is greater than the threshold value, a symbol decision is not rendered for the corresponding OFDM symbol, and on condition that the maximum likelihood is not greater than the threshold value, a repetitive symbol decision is rendered for the corresponding OFDM symbol. The repetition decision circuit 2605 sends commands to the symbol generator 2601 and the symbol decision circuit 2602, so as to render or suspend the repetitive symbol decision.

FIGS. 21 and 27 illustrate an example operation of the ninth embodiment. An OFDM symbol (2401 in FIG. 27A) is divided into a plurality of subcarrier groups (2102, 2103 and 2104 in FIGS. 21B, 21C and 21D, respectively), and a symbol (2403 in FIG. 27C) corresponding to the second subcarrier group (2103 in FIG. 21C) of the same OFDM symbol is generated so as to reflect the symbol decision result of the signal points of the first subcarrier group (2102 in FIG. 21B). Further, a symbol (2404 in FIG. 27D) corresponding to the third subcarrier group (2104 in FIG. 21D) is generated so as to reflect the symbol decision results of the signal points of the first and second subcarrier groups (2102 and 2103 in FIGS. 21B and 21C, respectively). Still further, a symbol (2701 in FIG. 27E) corresponding to the first subcarrier group (2102 in FIG. 21B) is generated so as to reflect the symbol decision results of the signal points of the second and third subcarrier groups (2103 and 2104 in FIGS. 21C and 21D, respectively). The OFDM demodulator of this embodiment repeats this operation until the repetition decision circuit 2605 issues the command of ending the repetition to the symbol generator 2601 and the symbol decision circuit 2602.

According to the OFDM demodulator of the ninth embodiment described above, in a case where the signal points of a certain subcarrier group of an OFDM symbol are to be generated and where the result of a symbol decision has existed as to another subcarrier group of the same OFDM symbol before, the signal points are generated so as to reflect the decision result, whereby the decision precision of the signal points of the individual subcarriers of the subcarrier group can be enhanced more at a later decision.

According to this embodiment, especially in the case where the symbol corresponding to the first subcarrier group is to be generated again, the signal point decision result of the second subcarrier group or the like can be reflected, and hence, the decision precision of the signal points of the individual subcarriers of the first subcarrier group can be enhanced.

Tenth Embodiment

Figure 28:
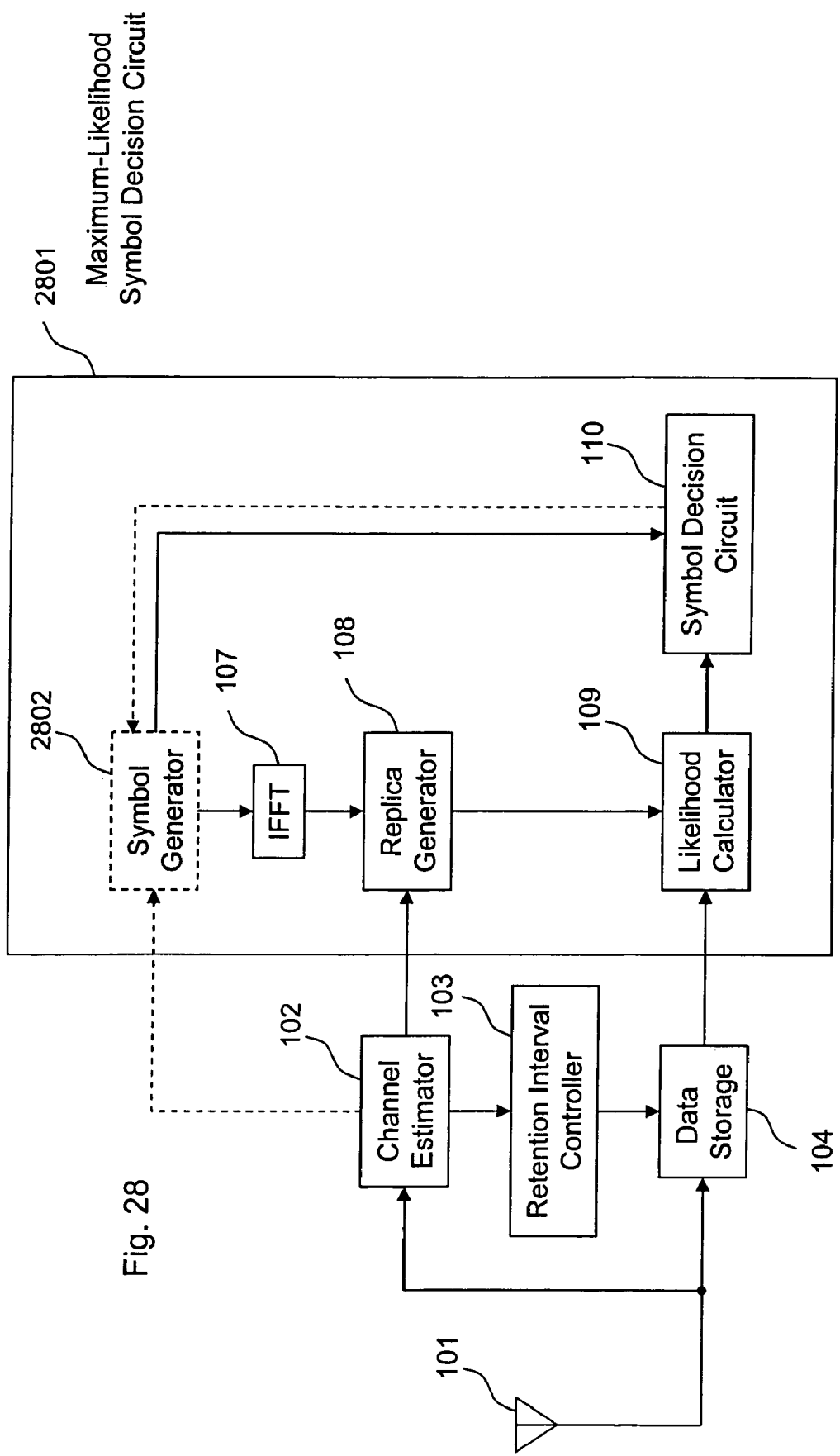
FIG. 28 is a block diagram of an OFDM demodulator according to a tenth embodiment of the invention.

FIG. 28 is a block diagram of an OFDM demodulator according to a tenth embodiment that generates the symbol of at least one subcarrier with high reliability based on channel response estimation values and generates symbols from the generated symbol by adding subcarriers one by one. Here, a subcarrier with high reliability is a subcarrier having an estimated channel response value greater than or equal to a predetermined threshold. Identical reference numerals are assigned to the same apparatus parts as in the OFDM demodulator of the first embodiment and these parts are omitted from the following description.

A maximum-likelihood symbol decision circuit 2801 generates symbols as to subcarriers of high reliability based on channel response values from a channel estimator 102, generates replica signals based on the channel response values from the channel estimator 102, and renders a decision so as to select the symbol which maximizes the likelihood that the replica signal is equivalent to a digital signal stored in a data storage 104.

A symbol generator 2802 generates the symbol of at least one subcarrier of high reliability based on the channel response estimation values from the channel estimator 102. A symbol decision circuit 110 decides the signal points of the subcarriers corresponding to the generated symbol. Subsequently, the symbol generator 2802 generates symbols from the remaining subcarriers by adding at least one subcarrier thereto, so as to reflect the signal point decision result of the subcarrier of high reliability.

Figure 29:
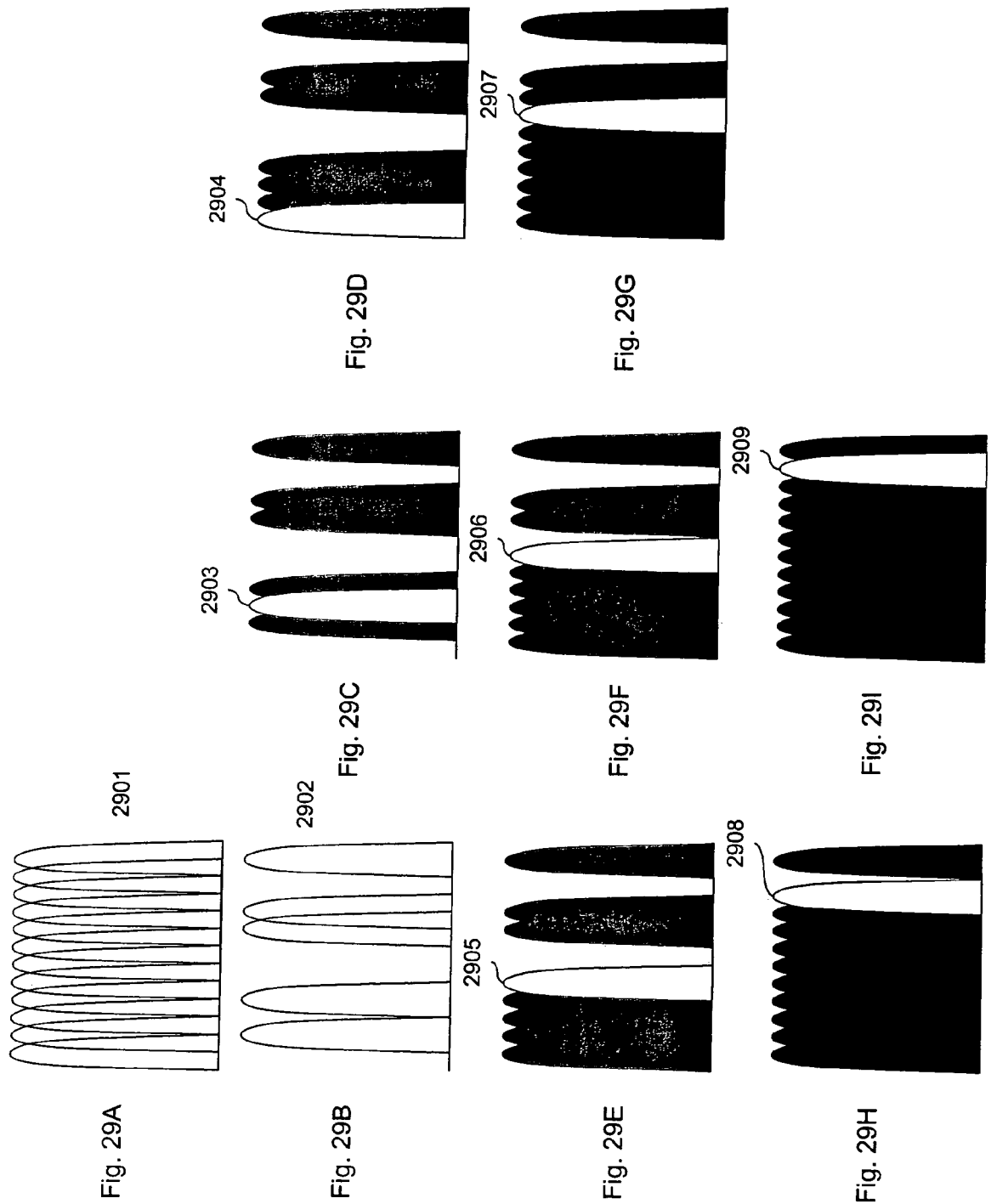
FIGS. 29A-29I are diagrams showing a situation where a symbol generator shown in FIG. 28 generates symbols.

FIGS. 29A-29I illustrate an example operation of the tenth embodiment. The symbol generator 2802 generates the symbol of five subcarriers 2902 (FIG. 29B) of high reliability from an OFDM symbol 2901 (FIG. 29A). Thereafter, the symbol decision circuit 110 subjects the signal points of the five subcarriers 2902 (FIG. 29B) to symbol decisions and adds subcarriers one by one (2903 (FIG. 29C)-2909 (FIG. 29I)). Each time the subcarrier is added, the symbol decision circuit 110 renders a symbol decision with the added signal included.

Figure 30:
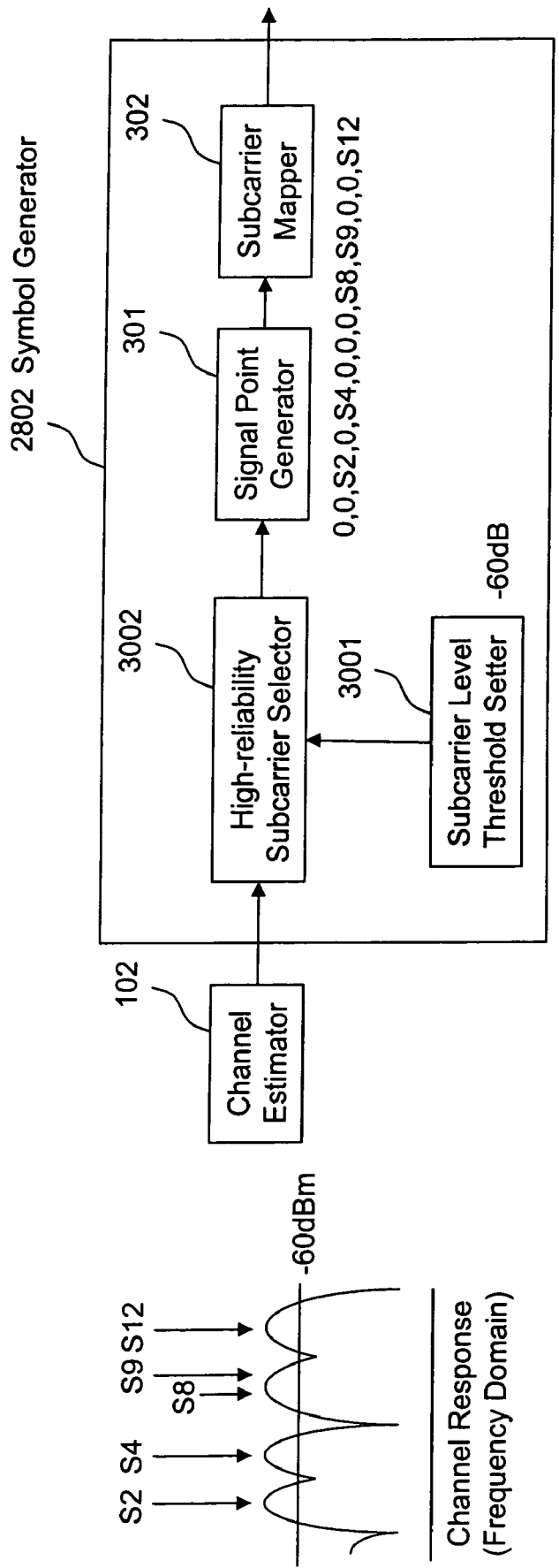
FIG. 30A is a waveform of a signal used in FIG. 30B.
FIG. 30B is a block diagram of the symbol generator shown in FIG. 28.

FIG. 30 illustrates an example operation and detailed block diagram of the symbol generator 2802, which includes a subcarrier level threshold setter 3001, a high-reliability carrier selector 3002, a signal point generator 301 and a subcarrier mapper 302 (FIG. 30B). The subcarrier level threshold setter 3001 sets the threshold value of the amplitude levels of a channel response in a frequency domain as estimated by the channel estimator 102. In FIG. 30A, the subcarrier level threshold setter 3001 sets the threshold value at −60 dBm. This threshold value is determined depending upon a propagation environment, the performance of the OFDM demodulator, etc., by a simulation, an experiment or the like.

The high-reliability subcarrier selector 3002 selects subcarriers which have amplitudes greater than the threshold value set by the subcarrier level threshold setter 3001. This high-reliability carrier selector 3002 extinguishes subcarriers which are not selected. In the example of FIG. 30, the high-reliability subcarrier selector 3002 selects subcarriers S2, S4, S8, S9 and S12, and the high-reliability subcarrier selector 3002 sets the signal points of the other subcarriers to zero.

According to the OFDM demodulator of the tenth embodiment described above, the signal points of subcarriers of low reliability are decided so as to reflect the signal point decision result of a subcarrier of high reliability, whereby the decision precision of the signal points of the subcarriers of low reliability can be enhanced. Moreover, according to the OFDM demodulator of this embodiment, the number of symbol candidates lessens, and hence, a processing quantity can be reduced.

Eleventh Embodiment

Figure 31:
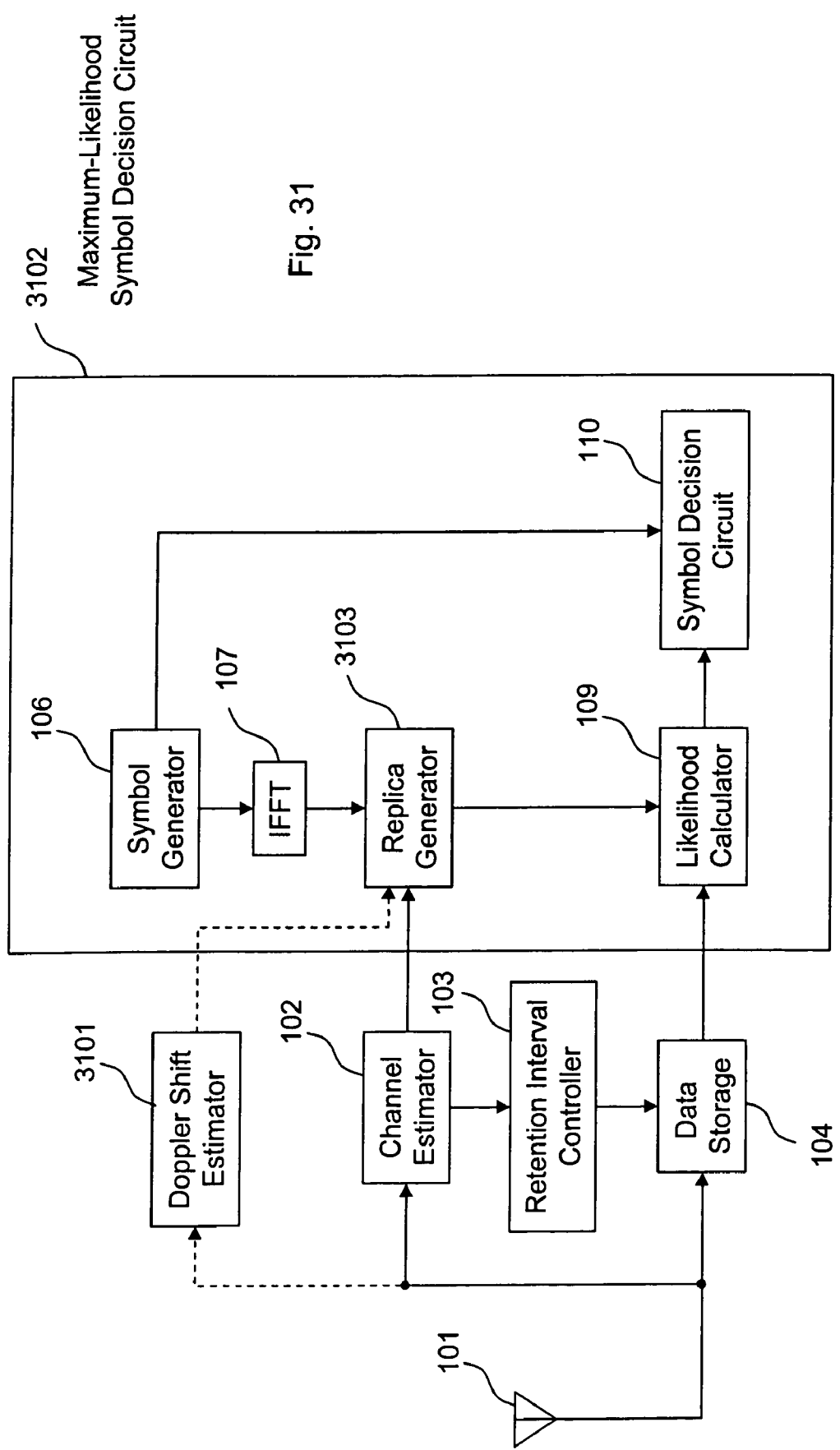
FIG. 31 is a block diagram of an OFDM demodulator according to an eleventh embodiment of the invention.

FIGS. 31 and 32 are block diagrams of an OFDM demodulator according to an eleventh embodiment that generates a replica signal based on the Doppler shift magnitude of a received signal, and renders a symbol decision by calculating a likelihood in accordance with the replica signal. Identical reference numerals are assigned to the same apparatus parts as in the OFDM demodulator of the first embodiment and these parts are omitted from the following description.

As shown in FIGS. 31 and 32, the OFDM demodulator of this embodiment includes a Doppler shift estimator 3101 in addition to the OFDM demodulator of the first embodiment, and a replica generator 3103 includes a delayed signal synthesizer 3201. The Doppler shift estimator 3101 estimates the Doppler shift magnitude of a signal received by an antenna 101. This Doppler shift estimator 3101 estimates the phase rotation magnitude P of a multipath component.

The replica generator 3103 generates the replica of the received signal based on a channel response estimation value obtained by a channel estimator 102 and the Doppler shift estimation value obtained by the Doppler shift estimator 3101. The delayed signal synthesizer 3201 included in the replica generator 3103 generates and synthesizes delayed signals based on a signal X(t) with a GI added, a channel coefficient H, a delay time d and the phase rotation magnitude P. By way of example, the delayed signal synthesizer 3201 outputs a synthesis signal Yr=X(t)+H×exp(j P t)×X(t−d). Here, $j^2=-1$ holds.

According to the OFDM demodulator of the eleventh embodiment described above, the replica of the received signal is generated in consideration of the Doppler shift estimation value, whereby a symbol decision precision can be enhanced.

The present invention includes processing of received signals, and methods or programs by which the received signals are processed. Such programs are typically stored and executed by a processor in a wireless receiver implemented in VLSI. The processor typically includes a computer program product for holding instructions programmed and for containing data structures, tables, records, or other data. Examples are computer readable media such as compact discs, hard disks, floppy disks, tape, magneto-optical disks, PROMs (EPROM, EEPROM, flash EPROM), DRAM, SRAM, SDRAM, or any other magnetic medium, or any other medium from which a processor can read.

The computer program product of the invention may include one or a combination of computer readable media to store software employing computer code devices for controlling the processor. The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The present invention is not restricted to the foregoing embodiments as they are, but the constituents of the embodiments can be modified and embodied within a scope not departing from the purport of the invention, at a stage at which the invention is carried out. Besides, various aspects of performance can be formed by appropriately combining a plurality of constituents disclosed in the embodiments. By way of example, some constituents may well be omitted from all constituents indicated in each embodiment. Further, the constituents of the different embodiments may well be appropriately combined.

Numerous modifications and variations of the present invention are possible in light of the above teachings. It is therefore to be understood that within the scope of the appended claims, the invention may be practiced otherwise than as specifically described herein.

The invention claimed is:

1. An Orthogonal Frequency Division Multiplexing (OFDM) demodulator, comprising:
   an antenna configured to receive a signal including delayed signals;
   an estimation circuit configured to estimate a channel response based on the signal received by the antenna;
   a control circuit configured to control a length of a retention time interval based on the channel response estimated by the estimation circuit, the retention time interval including a time period between a first time when a head of a delayed signal having a maximum delay difference among the delayed signals is received and a second time when a tail of a preceding signal included in the signal received by the antenna is received;
   a retention memory configured to retain a portion of the signal received by the antenna corresponding to the retention interval;
   a symbol generation circuit configured to generate OFDM symbol candidates;
   a conversion circuit configured to convert the OFDM symbol candidates into time domain signals;
   a replica generation circuit configured to generate replica signals of the signal received by the antenna based on the time domain signals and the channel response estimated by the estimation circuit;
   a calculation circuit configured to calculate likelihoods that the replica signals are equivalent to the portion of the signal retained in the retention memory; and
   a selection circuit configured to select an OFDM symbol from the OFDM symbol candidates that corresponds to the replica signal having a maximum likelihood.

2. The OFDM demodulator according to claim 1, further comprising:
   a decoding circuit configured to perform error correction decoding of the OFDM symbol selected by the selection circuit; and
   the symbol generation circuit is further configured to generate the OFDM symbol candidates having a predetermined number of subcarriers set to zero based on an error correctability of the decoder.

3. The OFDM demodulator according to claim 1, further comprising:
   a detecting circuit configured to detect transmission information from the signal received by the antenna; and
   the symbol generation circuit is further configured to generate the OFDM symbol candidates having a predetermined number of subcarriers set to zero based on the transmission information detected by the detecting circuit.

4. The OFDM demodulator according to claim 3, wherein the transmission information includes a carrier modulation scheme or a convolutional coding rate.

5. The OFDM demodulator according to claim 1, further comprising:
   a detecting circuit configured to detect transmission information from the signal received by the antenna; and
   the symbol generation circuit is further configured to generate the OFDM symbol candidates having a plurality of subcarriers set to zero at predefined intervals based on the transmission information detected by the detecting circuit.

6. The OFDM demodulator according to claim 1, wherein:
   the symbol generation circuit is further configured to generate the OFDM symbol candidates having a value of at least one of a plurality of subcarriers set to zero based on levels of the channel response estimated by the estimation circuit.

7. The OFDM demodulator according to claim 6, wherein:
   the symbol generation circuit is further configured to generate the OFDM symbol candidates having subcarriers set to zero for subcarriers having the channel response level equal to or less than a predetermined threshold.

8. The OFDM demodulator according to claim 1, further comprising:
   a decoding circuit configured to perform error correction decoding of the OFDM symbol selected by the selection circuit; and
   the symbol generation circuit is further configured to lower the precision of signal point candidates having an amplitude less than or equal to a predetermined threshold.

9. The OFDM demodulator according to claim 1, wherein:
   the symbol generation circuit is further configured to generate first OFDM symbol candidates at a first granularity;
   the selection circuit is further configured to select a first selected OFDM symbol having a maximum likelihood calculated by the calculation circuit from the first OFDM symbol candidates;
   the symbol generation circuit is further configured to generate second OFDM symbol candidates at a second granularity finer than the first granularity from among a region surrounding the first selected OFDM symbol; and
   the selection circuit is further configured to select a second selected OFDM symbol having a maximum likelihood calculated by the calculation circuit from the second OFDM symbol candidates.

10. The OFDM demodulator according to claim 1, wherein:
    the symbol generation circuit is further configured to divide a plurality of subcarriers included in each OFDM symbol into a plurality of groups and to generate the OFDM symbol candidates for the groups; and
    the selection circuit is further configured to select the OFDM symbol having a maximum likelihood calculated by the calculation circuit from the OFDM symbol candidates for every group.

11. The OFDM demodulator according to claim 1, wherein:
    the symbol generation circuit is further configured to divide a plurality of subcarriers included in each OFDM symbol into a plurality of groups and to generate first OFDM symbol candidates for a first one of the groups;

the selection circuit is further configured to select a first selected OFDM symbol having a maximum likelihood calculated by the calculation circuit from the first group in the first OFDM symbol candidates;

the symbol generation circuit is further configured to generate second OFDM symbol candidates for a second one of the groups based on the first selected OFDM symbol of the first group; and the selection circuit is further configured to select a second OFDM symbol having a maximum likelihood calculated by the calculation circuit from the second group in the second OFDM symbol candidates.

12. The OFDM demodulator according to claim 11, wherein:

the symbol generation circuit is further configured to regenerate the first OFDM symbol candidates of the first one of the groups based on the second selected OFDM symbol of the second group; and the selection circuit is further configured to select the OFDM symbol having a maximum likelihood calculated by the calculation circuit from the first OFDM symbol candidates regenerated.

13. The OFDM demodulator according to claim 12, wherein:

the OFDM symbol generation circuit is further configured to regenerate the OFDM symbol candidates based on an OFDM symbol previously selected by the selection circuit, in a case where the likelihood calculated by the calculation circuit is less than or equal to a predetermined threshold.

14. The OFDM demodulator according to claim 1, wherein:

the symbol generation circuit is further configured to generate first OFDM symbol candidates for at least one subcarrier having the estimated channel response value greater than or equal to a predetermined threshold;

the selection circuit is further configured to select a first selected OFDM symbol having a maximum likelihood calculated by the calculation circuit from the first OFDM symbol candidates;

the symbol generation circuit is further configured to generate second OFDM symbol candidates by adding at least one other subcarrier based on the first selected OFDM symbol; and the selection circuit is further configured to select a second OFDM symbol having a maximum likelihood calculated by the calculation circuit from the second OFDM symbol candidates.

15. The OFDM demodulator according to claim 1, further comprising:

a Doppler shift estimation circuit configured to estimate a Doppler shift magnitude of the received signal; and the replica generation circuit is further configured to generate the replica signals of the signal received by the antenna based on the channel response estimated by the estimation circuit and the Doppler shift magnitude estimated by the Doppler shift estimation circuit.

16. A method for demodulating an Orthogonal Frequency Division Multiplexing (OFDM) received signal including plural delayed signals received by an antenna, the method comprising:

estimating a channel response based on the received signal by an estimation circuit;

controlling a length of a retention interval based on the estimated channel response, the retention interval including a time period between a first time when a head of a delayed signal having a maximum delay difference among the delayed signals is received and a second time when a tail of a preceding signal included in the received signal is received;

retaining a portion of the received signal corresponding to the retention interval;

generating OFDM symbol candidates;

converting the OFDM symbol candidates into time domain signals;

generating replica signals of the received signal based on the time domain signals and the estimated channel response;

calculating likelihoods that the replica signals are equivalent to the portion of the received signal retained in the retention memory; and selecting an OFDM symbol from the OFDM symbol candidates that corresponds to the replica signal having a maximum likelihood.

17. A computer program product storing a program in a computer readable storage medium which, when executed by a processor in an apparatus configured to demodulate an Orthogonal Frequency Division Multiplexing (OFDM) received signal including plural delayed signals received by an antenna, causes the processor to perform steps comprising:

estimating a channel response based on the received signal;

controlling a length of a retention interval based on the estimated channel response, the retention interval including a time period between a first time when a head of a delayed signal having a maximum delay difference among the delayed signals is received and a second time when a tail of a preceding signal included in the received signal is received;

retaining a portion of the received signal corresponding to the retention interval;

generating OFDM symbol candidates;

converting the OFDM symbol candidates into time domain signals;

generating replica signals of the received signal based on the time domain signals and the estimated channel response;

calculating likelihoods that the replica signals are equivalent to the portion of the received signal retained in the retention memory; and selecting an OFDM symbol from the OFDM symbol candidates that corresponds to the replica signal having a maximum likelihood.

* * * * *